(12) United States Patent
Hurwitz et al.

(10) Patent No.: US 12,306,349 B2
(45) Date of Patent: May 20, 2025

(54) PROXIMITY DETECTION SYSTEM

(71) Applicant: Analog Devices International Unlimited Company, Limerick (IE)

(72) Inventors: Jonathan Ephraim David Hurwitz, Edinburgh (GB); Javier Calpe Maravilla, Alegemesi (ES); Eoin E. English, Pallasgreen (IE); Krystian Balicki, Wrzesnia (PL)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 1043 days.

(21) Appl. No.: 17/319,777

(22) Filed: May 13, 2021

(65) Prior Publication Data
US 2021/0356568 A1 Nov. 18, 2021

Related U.S. Application Data

(60) Provisional application No. 63/025,514, filed on May 15, 2020.

(51) Int. Cl.
| G01S 7/48 | (2006.01) |
| G01S 7/4863 | (2020.01) |
| G01S 7/4865 | (2020.01) |
| G01S 17/10 | (2020.01) |
| G01S 17/894 | (2020.01) |

(52) U.S. Cl.
CPC .......... *G01S 7/4866* (2013.01); *G01S 7/4804* (2013.01); *G01S 7/4863* (2013.01); *G01S 17/10* (2013.01); *G01S 17/894* (2020.01)

(58) Field of Classification Search
USPC ....................................................... 356/5.01
See application file for complete search history.

(56) References Cited

U.S. PATENT DOCUMENTS

| 7,791,715 | B1 | 9/2010 | Bamji |
| 8,159,598 | B2 | 4/2012 | Watanabe et al. |
| 8,767,189 | B2 | 7/2014 | Mase et al. |
| 9,519,052 | B2 * | 12/2016 | Gusev .................. G01C 15/002 |
| 9,625,569 | B2 | 4/2017 | Lange |
| 9,952,323 | B2 * | 4/2018 | Deane ..................... G01S 17/48 |
| 10,455,153 | B2 * | 10/2019 | Smith ................... H04N 23/667 |

(Continued)

*Primary Examiner* — James R Hulka
(74) *Attorney, Agent, or Firm* — ARENTFOX SCHIFF LLP

(57) ABSTRACT

Systems and methods for a Time of Flight (ToF) camera system configured to be operable in a proximity mode. In the proximity mode, the proximity of an object may be estimated by relatively delaying or offsetting the charge accumulation timing of multiple different columns of pixels of the ToF imaging sensor. The relative charge accumulated in those pixel columns is dependent on the proximity of the object and the relative time delays in charge accumulation of each column. Therefore, by reading out the charge accumulated in multiple different pixel columns and knowing the relative accumulation delay of those pixel columns, the proximity of an object may be determined. This enables the operation of the ToF camera system to be switched between relatively high power, full ToF depth imaging, and relatively low power proximity mode of operation, thereby rendering a single system as being capable of performing two different functions.

20 Claims, 14 Drawing Sheets

(56) References Cited

U.S. PATENT DOCUMENTS

| | | |
|---|---|---|
| 10,795,004 B2 | 10/2020 | Masuda |
| 11,448,757 B2 * | 9/2022 | Mori ..................... G01S 17/894 |
| 11,876,346 B2 * | 1/2024 | Shen ...................... G01S 17/10 |
| 2010/0046802 A1 * | 2/2010 | Watanabe ............. G01S 17/894 |
| | | 348/46 |
| 2010/0231891 A1 * | 9/2010 | Mase ..................... H04N 25/59 |
| | | 257/443 |
| 2014/0346361 A1 | 11/2014 | Wang et al. |
| 2015/0285625 A1 | 10/2015 | Deane |
| 2015/0338509 A1 * | 11/2015 | Lange .................. G01S 17/894 |
| | | 356/5.01 |
| 2016/0181295 A1 * | 6/2016 | Wan ..................... H04N 25/705 |
| | | 257/440 |
| 2016/0231419 A1 | 8/2016 | Gusev |
| 2016/0316112 A1 * | 10/2016 | Tadano ................... G01S 17/18 |
| 2017/0234985 A1 * | 8/2017 | Kadambi ............. G01S 17/894 |
| | | 702/152 |
| 2018/0278843 A1 | 9/2018 | Smith et al. |
| 2019/0079170 A1 * | 3/2019 | Masuda ................ G01S 7/4865 |
| 2019/0113966 A1 * | 4/2019 | Connellan ................ G01S 5/16 |
| 2019/0391266 A1 | 12/2019 | Mori et al. |
| 2020/0066779 A1 * | 2/2020 | Dutton .............. H01L 31/02027 |
| 2020/0284883 A1 * | 9/2020 | Ferreira ............... H04N 25/773 |
| 2020/0412087 A1 * | 12/2020 | Shen .................... G01S 17/894 |
| 2021/0337149 A1 * | 10/2021 | Tadmor ................ H04N 25/771 |
| 2021/0356597 A1 * | 11/2021 | Hurwitz ................. G01S 7/491 |

\* cited by examiner (a)

(b)

(c)

PROXIMITY DETECTION SYSTEM

PRIORITY DATA

This application claims the benefit pursuant to 35 U.S.C. § 119(e) of U.S. Provisional Patent Application Ser. No. 63/025,514 filed on May 15, 2020, entitled "PROXIMITY DETECTION SYSTEM", the entirety of which is incorporated by reference herein.

BACKGROUND

Proximity sensors may be used for many different purposes. For example, in a mobile device (such as a smartphone, tablet computer or laptop computer) they may be used to detect that a user is holding the device to their face (for example, during a voice call) and disable the touch screen of the device to avoid unwanted interaction between the ear and the touch screen. They may also be used to reduce display power consumption by switching the display on or off depending on how the device is being used, for example turning off the screen when the device is held to the user's ear during a voice call. They may also be used to control other functions of the device, such as waking up a biometric authentication circuit, such as a face scanner, when a user is holding the device within a particular distance of their body. Because of the limited power available to mobile devices, it is desirable for the proximity sensor to be of a relatively low power design, particularly as they may be regularly in operation.

For many mobile devices, there is limited room to incorporate a proximity sensor along with all other sensors that may be required. For example, for a front facing smartphone that incorporates a number of sensors/devices on its front face, such as a camera(s), a light(s), a speaker(s), etc, in addition to a large screen, incorporating a dedicated low-power proximity sensor represents an additional cost on available device space.

SUMMARY OF THE DISCLOSURE

The present disclosure relates to a Time of Flight (ToF) camera system configured to be operable in a proximity mode. In the proximity mode, the proximity of an object may be estimated by relatively delaying or offsetting the charge accumulation timing of multiple different columns of pixels of the ToF imaging sensor. The relative charge accumulated in those pixel columns is dependent on the proximity of the object and the relative time delays in charge accumulation of each column. Therefore, by reading out the charge accumulated in multiple different pixel columns and knowing the relative accumulation delay of those pixel columns, the proximity of an object may be determined. This enables the operation of the ToF camera system to be switched between relatively high power, full ToF depth imaging, and relatively low power proximity mode of operation, thereby rendering a single system as being capable of performing two different functions.

In the first aspect of the disclosure, there is provided a time of flight, ToF, camera system configured to operate in a proximity mode to determine a proximity of an object, the ToF camera system comprising: a laser configured to output laser light; an imaging sensor comprising a plurality of pixels configured to accumulate charge based on incident light that comprises laser light reflected by the object; and an image acquisition system configured, when operating in the proximity mode, to: control a timing of charge accumulation in the imaging sensor using a demodulation signal; and read out a charge sample from the imaging sensor that is indicative of charge accumulated by one or more pixels in each of a plurality of pixel columns of the imaging sensor; and a delay block arranged to apply a column delay to the demodulation signal used by pixel columns of the imaging sensor, such that the timing of application of the demodulation signal to at least some of the plurality of pixel columns of the imaging sensor is different, wherein the amount of charge accumulated in each of the plurality of pixel columns is dependent on: the distance to the object; and the column delay applied by the delay block to the demodulation signal for the pixel column, and wherein the image acquisition system is configured to determine the proximity of the object based on: the read out charge sample; and the column delay of each of the plurality of pixel columns.

The image acquisition system may be configured to determine the proximity of the object by: determining a delay time corresponding to an extremum in a measurement function that describes a relationship between: the read out charge sample; and the column delay applied to the demodulation signal for each of the plurality of pixel columns; and determining the proximity of the object using the delay time corresponding to the extremum in the measurement function.

The image acquisition system may be further configured to determine the proximity of the object by: a) determining a time delay difference by comparing: the delay time corresponding to the extremum in the measurement function; and a predetermined delay time corresponding to an extremum in a function that describes the charge accumulated by the one or more pixels in each of the plurality of pixel columns when an object is at a known distance; and b) determining the proximity of the object using the time delay difference.

The extremum in the measurement function may be a highest or lowest charge value in the read out charge sample, and wherein the delay time corresponding to the extremum in the measurement function is the column delay applied to the pixel column having the highest or lowest charge value in the read out charge sample.

Determining the delay time corresponding to the extremum in the measurement function may comprise: performing interpolation on at least part of the readout charge data; and identifying the extremum and corresponding delay time using the interpolation.

Determining the proximity of the object may comprise: performing an autocorrelation on at least part of the readout charge sample; and comparing the autocorrelation on the readout charge sample against an autocorrelation of the charge accumulated by one or more pixels in each of the plurality of pixel columns when an object is at a known distance.

Determining the proximity of the object may comprise: performing a cross correlation between at least part of the readout charge sample and the charge accumulated by one or more pixels in each of the plurality of pixel columns when an object is at a known distance.

Determining the proximity of the object may comprise applying a Discrete Fourier Transform, DFT, to at least part of the charge sample readout from the imaging sensor.

The ToF camera system may be further configured to be operable in a depth sensing mode for the determination of a depth image, wherein the ToF camera system is configured to switchably operate in the proximity mode or the depth mode.

The ToF camera system may be configured to drive the laser at a lower power when operating in the proximity mode compared with when operating in the depth mode.

The ToF camera system may be configured to utilise data from fewer pixels of the imaging sensor when operating in the proximity mode compared with when operating in the depth mode.

In a second aspect of the disclosure, there is provided a method of determining a proximity of an object using a ToF camera system, the method comprising: controlling a timing of charge accumulation in the imaging sensor using a demodulation signal, wherein for each pixel column of the imaging sensor a column delay is applied to the demodulation signal such that the start and end timing of charge accumulation varies for different pixel columns across the imaging sensor; reading out a charge sample from an imaging sensor of the ToF camera system, wherein the charge sample is indicative of charge accumulated by one or more pixels in each of a plurality of pixel columns of the imaging sensor; and determining the proximity of the object using the readout charge sample and the column delay applied to each of the plurality of pixel columns.

In a third aspect of the disclosure, there is provided a ToF camera comprising: a light source configured to output light; an imaging sensor comprising a plurality of pixels configured to accumulate charge based on incident light that comprises light output by the light source and reflected by the object; and an image acquisition system configured to switchably operate in a depth sensing mode or a proximity mode; wherein in the depth sensing mode the image acquisition system is configured to generate a depth frame representing the distance of objects within a field of view of the ToF camera, and wherein in the proximity mode the image acquisition system is configured to determine a proximity of an object to the ToF camera, and wherein the proximity mode of operation has a relatively lower power of operation than the depth sensing mode of operation.

In the proximity mode of operation the image acquisition system may be configured to control a timing of charge accumulation in the imaging sensor using a demodulation signal, wherein for each pixel column of the imaging sensor a column delay is applied to the demodulation signal such that the start and end timing of charge accumulation varies for different pixel columns across the imaging sensor; read out a charge sample from an imaging sensor of the ToF camera system, wherein the charge sample is indicative of charge accumulated by one or more pixels in each of a plurality of pixel columns of the imaging sensor; and determine the proximity of the object using the readout charge sample and the column delay applied to each of the plurality of pixel columns Determining the proximity of the object may comprise: determining a first distance to the object using a first set of values in the readout charge sample; determining a second distance to the object using a second set of values in the readout charge sample; and determining the proximity of the object using the first determined distance and the second determined distance.

The image acquisition system may be configured to receive a control signal that controls the mode of operation of the image acquisition system.

The image acquisition system may be configured to switch from operating in the proximity mode to operate in the depth sensing mode when a determined proximity of the object is within a predetermined proximity.

The image acquisition system may be configured to alternative between the proximity mode of operation and a sleep mode of operation according to a predetermined cycle.

The image acquisition system may comprise readout circuitry and the image acquisition system may be configured to operate the readout circuitry in a lower power mode during the proximity mode compared with during the depth sensing mode.

In the depth sensing mode the image acquisition system may be configured to generate the depth frame using a first number of pixel charges readout from the imaging sensor, wherein in the proximity mode the image acquisition system is configured to determine the proximity of the object using a second number of pixel charges readout from the imaging sensor, and wherein the second number of pixel charges is larger than the first number of pixel charges.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which.

DETAILED DESCRIPTION

The inventors have devised a ToF camera system that can be operated in a low-power proximity sensing mode or a high quality depth imaging and/or 2D IR imaging mode. As a result, the same system can be used for two purposes, thereby reducing the number of different components or sensors required by a device that incorporates the ToF camera system. Consequently, device space is freed up, which may be particularly beneficial for mobile devices.

Time-of-flight (ToF) camera systems are range imaging systems that resolve the distance between the camera and an object by measuring the round trip of light emitted from the ToF camera system. The systems typically comprise a light source (such as a laser or LED), a light source driver to control the emission of light from the light source, an image sensor to image light reflected by the subject, an image sensor driver to control the operation of the image sensor, optics to shape the light emitted from the light source and to focus light reflected by the object onto the image sensor, and a computation unit configured to determine the distance to the object based on the emitted light and the corresponding light reflection from the object.

In a Continuous Wave (CW) ToF camera system, multiple periods of a continuous light wave are emitted from the laser. The system is then configured to determine the distance to the imaged object based on a phase difference between the emitted light and the received reflected light. CW ToF systems often modulate the emitted laser light with a first modulation signal and determine a first phase difference between the emitted light and reflected light, before modulating the emitted laser light with a second modulation signal and determine a further phase difference between the emitted light and reflected light. A depth map/depth frame (sometimes referred to as a 3D image) can then be determined based on the first and second phase differences. The first modulation signal and second modulation signals have different frequencies so that the first and second phase differences can be used to resolve phase wrapping. An active brightness frame/2D IR frame (sometimes referred to as a 2D image) can be determined based on the magnitudes of accumulated charge in the imaging pixels of the image sensor.

In a pulsed ToF camera system, one or more pulses of laser light are emitted, with reflected light being received at the image sensor. A depth map/depth frame may be determined based on a time difference between emission of the pulse(s) and reception of the reflected light. An active brightness frame/2D IR frame (sometimes referred to as a 2D image) can be determined based on the magnitudes of accumulated charge in the imaging pixels of the image sensor.

Figure 1:
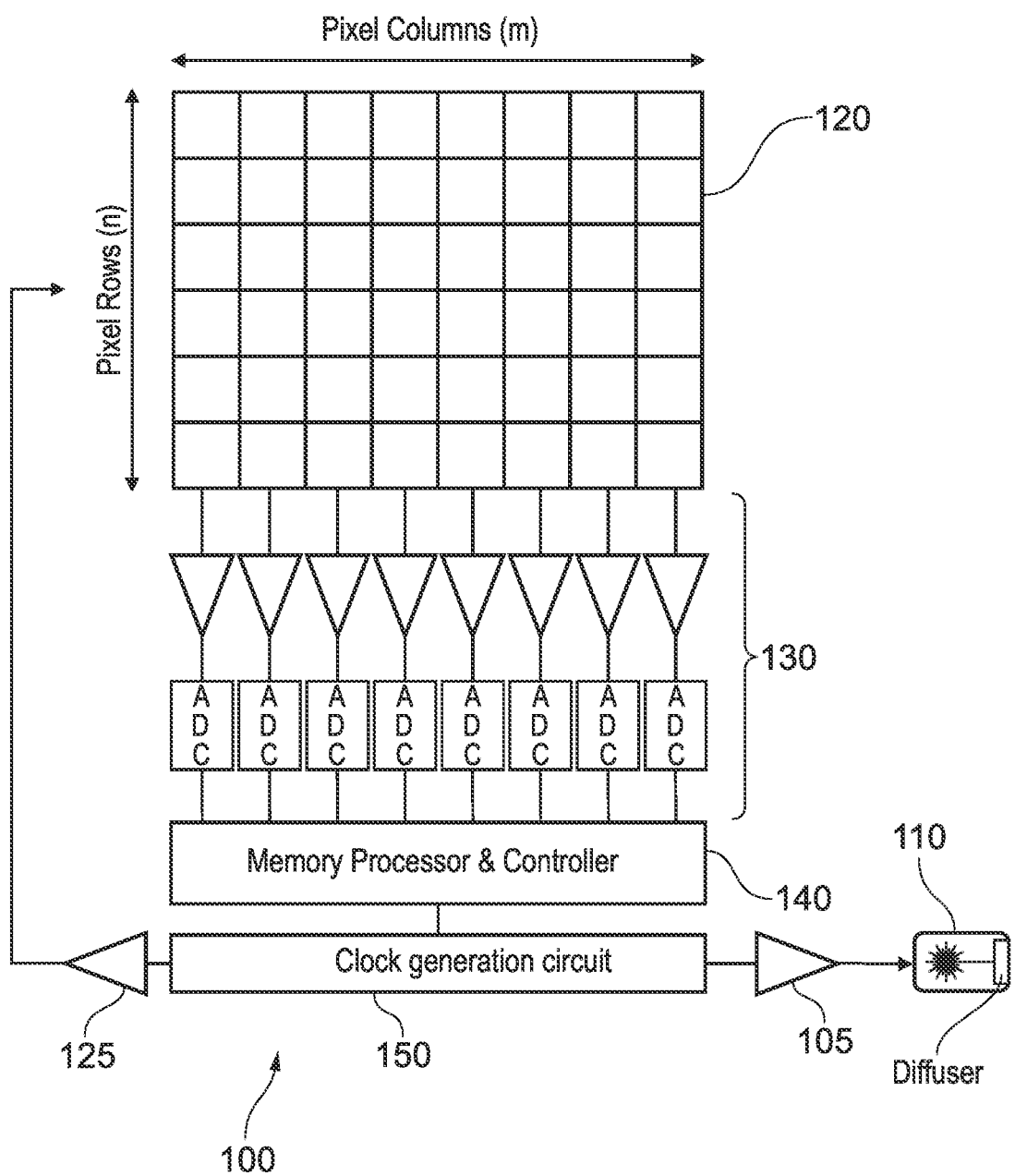
FIG. 1 shows an example representation of a CW ToF camera system, according to various embodiments of the disclosure.

FIG. 1 shows an example representation of a CW ToF camera system 100. The system 100 comprises a laser 110 (which may be any suitable type of laser) and a laser driver 105 configured to drive the laser 110 into light emission.

The system 100 also comprises an imaging sensor 120 that comprises a plurality (in this case m×n) of imaging pixels. A converter system 130 (comprising a plurality of amplifiers and ADCs) is coupled to the imaging sensor 120 for reading off charge accumulated on the imaging pixels and converting to digital values, which are output to the memory processor & controller 140. The nature of the values read out from the imaging sensor 120 will depend on the technology of the imaging sensor 120. For example, if the imaging sensor is a CMOS sensor, voltage values may be readout, where each voltage value is dependent on the charge accumulated in an imaging pixel of the imaging sensor 120, such that the readout values are each indicative of charge accumulated in imaging pixels of the imaging sensor 120. In other sensor technologies, the nature of the readout values may be different, for example charge may be directly readout, or current, etc. The memory processor & controller 140 is configured to determine depth frames (also referred to as depth maps), indicative of distance to the object being imaged, based on the received digital values indicative of charge accumulated on the imaging pixels. The memory processor & controller 140 may also be configured to determine active brightness frames (also referred to as 2D IR frames/images). The memory processor & controller 140 controls a clock generation circuit 150, which outputs timing signals for driving the laser 110 and for reading charge off the imaging sensor 120. The converter system 130, memory processor & controller 140 and clock generation circuit 150 may together be referred to as an image acquisition system, configured to determine one or more depth frames by controlling the laser 110, reading off the image sensor 120 and processing the resultant data.

Figure 2:
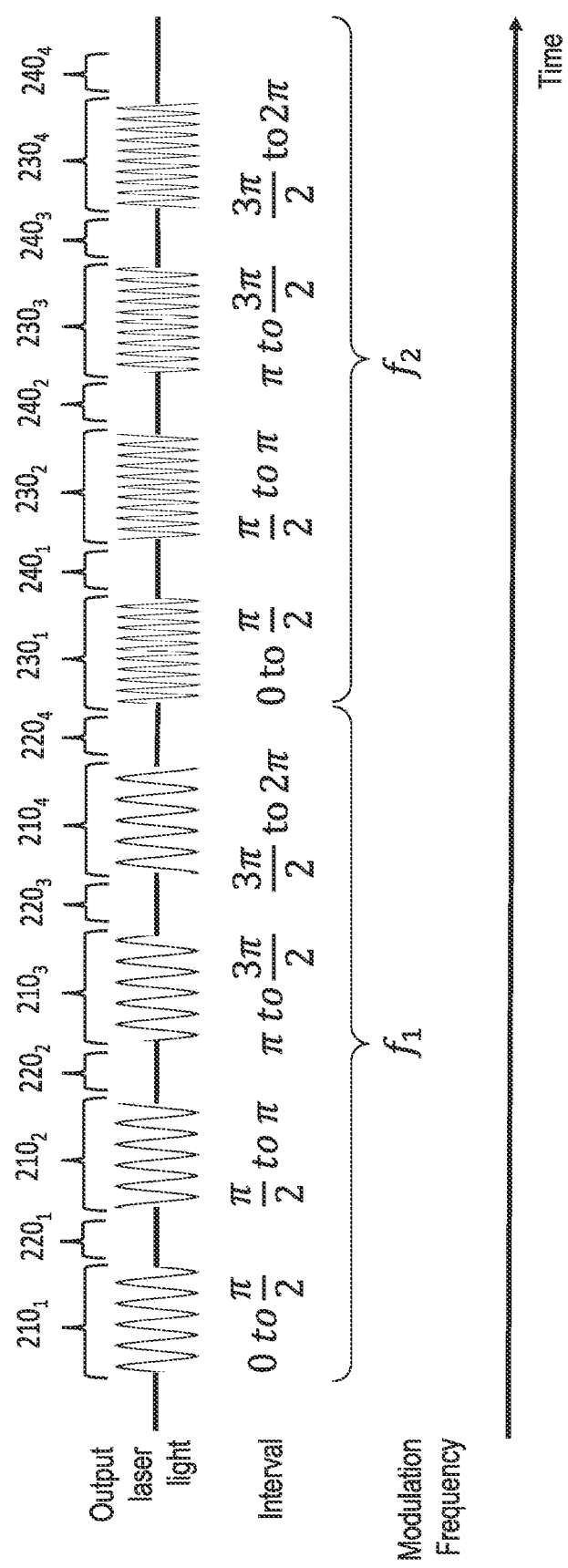
FIG. 2 shows an example schematic diagram to help explain the operation of the system of FIG. 1, according to various embodiments of the disclosure.

FIG. 2 shows an example schematic diagram to help explain the operation of the system 100. The memory processor & controller 140 and clock generation circuit 150 control the laser 110 to output first laser light modulated by a first modulation signal having a first frequency $f_1$ for an accumulation period of time $210_1$. During this period of time, some of the first laser light reflected from the object will be incident on the imaging sensor 120. During the accumulation period of time $210_1$, the memory processor & controller 140 and clock generation circuit 150 also controls the imaging sensor 120 to accumulate charge based on the incident reflected first laser light for the first part/interval of the period/cycle of the first laser light (0° to 90°, or 0 to π/2). For example, the imaging sensor 120 is controlled to "open its shutter" for charge accumulation at the times when the phase of the emitted first laser light is between 0° to 90°. This is so that the phase of the received first laser light relative to the emitted first laser light at a first interval of 0 to π/2 may later be determined using the charge accumulated on the imaging sensor 120, for example by cross correlating the accumulated charge signal with the first modulation signal. In this example, accumulation takes place for half of the period/cycle of the first laser light, but may alternatively take place for any other suitable amount of time, for example for one quarter of the phase of the first laser light. The skilled person will readily understand how to control the accumulation timing of the imaging sensor 120 using control signals based on the timing of the laser modulation signal. As will be understood by the skilled person, if the image sensor 120 is a single ended pixel type, the pixels may be controlled to accumulate charge for this part/interval of the period and not accumulate any charge for the remainder of the period. If the image sensor 120 is a differential pixel type, the pixels may be controlled to accumulate charge for this part/interval of the period on one side of the pixel and accumulate charge on the other side of the pixel for the remainder of the period. This also applies to the other accumulation parts/intervals described later.

During a subsequent read out period of time $220_1$, the memory processor & controller 140 and clock generation circuit 150 control the first laser $110_1$ to cease emitting light and control readout image sensor values that are indicative of the charge accumulated in the imaging pixels of the imaging sensor 120. The nature of the readout values will depend on the technology of the imaging sensor 120. For example, if the imaging sensor is a CMOS sensor, voltage values may be readout, where each voltage value is dependent on the charge accumulated in an imaging pixel of the imaging sensor 120, such that the readout values are each indicative of charge accumulated in imaging pixels of the imaging sensor 120. In other sensor technologies, the nature of the readout values may be different, for example charge may be directly readout, or current, etc. For example, the imaging sensor 120 may be controlled to readout image sensor values from row-by-row using any standard readout process and circuitry well understood by the skilled person. In this way, a sample of charge accumulated by each imaging pixel during the period $210_1$ may be read off the imaging sensor 120, converted to a digital value and then stored by the memory processor & controller 140. The group of values, or data points, arrived at the conclusion of this process is referred to in this disclosure as a charge sample.

It will be appreciated that the accumulation period of time $210_1$ may last for multiple periods/cycles of the first modulation signal (as can be seen in FIG. 1) in order to accumulate sufficient reflected light to perform an accurate determination of the phase of the received reflected light relative to the first modulation signal, for the interval 0 to $\pi/2$ of the first modulation signal.

During accumulation period of time $210_2$, the memory processor & controller 140 and clock generation circuit 150 again control the first laser $110_1$ to output first laser light modulated by the first modulation signal for an accumulation period of time $210_2$. This is very similar to the accumulation period $210_1$, except during accumulation period of time $210_2$ the memory processor & controller 140 and clock generation circuit 150 controls the imaging sensor 120 to accumulate charge for the second part/interval of the period/cycle of the first modulation signal (90° to 180°, or $\pi/2$ to $\pi$). The read out period $220_2$ is very similar to period $220_1$, except the obtained charge sample relates to a shifted or delayed interval of $\pi/2$ to $\pi$ of the first modulation signal.

Accumulation period of time $210_3$ is very similar to the period $210_2$, except the memory processor & controller 140 and clock generation circuit 150 controls the imaging sensor 120 to accumulate charge for the third part/interval of the period/cycle of the first modulation signal (180° to 270°, or $\pi$ to $3\pi/2$). The read out period $220_3$ is very similar to period $220_2$, except the sampled charge data relates to a shifted or delayed interval of $\pi$ to $3\pi/2$ of the first modulation signal.

Finally, accumulation period of time $210_4$ is very similar to the period $210_3$, except the memory processor & controller 140 and clock generation circuit 150 also controls the imaging sensor 120 to accumulate charge based on the incident reflected first laser light for a fourth part/interval of the period/cycle of the first modulation signal (270° to 360°, or $3\pi/2$ to $2\pi$). The read out period $220_4$ is very similar to period $220_3$, except the charge sample relates to a shifted or delayed interval of $3\pi/2$ to $2\pi$ (or, put another, a shifted or delayed interval of $3\pi/2$ to 0).

After completing this, four samples of data (charge samples) have been acquired and stored in memory. They together may be referred to as a first set of charge samples. Immediately after the read out period $220_4$, or at some later time, a phase relationship between the first laser light and the received reflected light may be determined using the four charge samples (for example by performing a discrete Fourier transform (DFT) on the samples to find the real and imaginary parts of the fundamental frequency, and then determining the phase from the real and imaginary parts, as will be well understood by the skilled person). This may be performed by the image acquisition system, or the charge samples may be output from the image acquisition system to an external processor via a data bus for the determination of the phase relationship. Optionally, active brightness (2D IR) may also be determined (either by the image acquisition system or the external processor) for the reflected first laser light using the four samples (for example, by determining the magnitude of the fundamental frequency from the real and imaginary parts, as will be well understood by the skilled person).

The skilled person will readily understand that using DFT to determine the phase relationship between the first laser light and the received reflected laser light, and to determine active brightness, is merely one example and that any other suitable alternative technique may be used. By way of brief explanation a further non-limiting example is now described.

The transmitted, modulated laser signal may be described by the following equation:

$$s(t) = A_s \sin(2\pi f t) + B_s$$

Where:
s(t)=optical power of emitted signal
f=laser modulation frequency
$A_s$=amplitude of the modulated emitted signal
$B_s$=offset of the modulated emitted signal The signal received at the imaging sensor may be described by the following equation:

$$r(t) = \alpha(A_s \sin(2\pi f t + \Phi) + B_s) + B_{env}$$

$$\Phi = 2\pi f \Delta$$

$$\Delta = \frac{2d}{c}$$

Where:
r(t)=optical power of received signal
α=attenuation factor of the received signal
ϕ=phase shift
$B_{env}$=amplitude of background light
Δ=time delay between emitted and received signals (i.e., time of flight)
d=distance to imaged object
c=speed of light Accumulation timing of the imaging pixels may be controlled using a demodulation signal, g(t−τ), which is effectively a time delayed version of the illumination signal.

$$g(t-\tau) = A_g \sin(2\pi f(t-\tau)) + B_g$$

Where:
τ=a variable delay, which can be set to achieve the phase delays/offsets between each accumulation period $210_1$-$210_4$ described above
$A_g$=amplitude of the demodulation signal
$B_g$=offset of the demodulation signal The imaging pixels of the imaging sensor effectively multiply the signals r(t) and g(t−τ). The resulting signal may be integrated by the imaging pixels of the imaging sensor to yield a cross correlation signal c(τ):

$$c(\tau) = A\sin(2\pi f(t-\tau)) + B$$

By driving the imaging sensor to accumulate at different offsets during different accumulation periods, as described above, it is possible to measure correlation at different time offsets τ (phase-offsets φ) 0, π/2, π, 3π/2:

$$c(\tau) = A\sin(2\pi f(t-\tau)) + B = A\sin(\Phi - \varphi) + B$$

$$c(\tau) = A(\sin(\Phi)\cos(-\varphi) + \cos(\Phi)\sin(-\varphi)) + B$$

$$c(0) = A1 = A(\sin(\Phi)) + B$$

$$c\left(\frac{\pi}{2}\right) = A2 = -A(\cos(\Phi)) + B$$

$$c(\pi) = A3 = -A(\sin(\Phi)) + B$$

$$c\left(\frac{3\pi}{2}\right) = A4 = A(\cos(\Phi)) + B$$

From these readings, it can be determined that the phase offset/time of flight can be found by:

$$\Phi = 2\pi f\Delta = \arctan\left(\frac{\sin(\Phi)}{\cos(\Phi)}\right) = \mathrm{atan}\left(\frac{A1-A3}{A4-A2}\right)$$

Therefore, a depth image or map can be determined using the four charge samples acquired from the image sensor.

An active brightness, or 2D IR, image/frame may also be determined by determining $\sqrt{(A4-A2)^2 + (A1-A3)^2}$.

Subsequently, the process described earlier in relation to periods $210_1$-$210_4$ and $220_1$-$220_4$ may then be repeated in accumulation periods $230_1$-$230_4$ and read out periods $240_1$-$240_4$. These are the same as the accumulation periods $210_1$-$210_4$ and read out periods $220_1$-$220_4$, except rather than driving the laser $110_1$ to emit light modulated with the first modulation signal, the laser 110 is driven to emit light modulated with a second modulation signal. The second modulation signal has a second frequency $f_2$, which is higher than the first frequency $f_1$. As a result, four further samples of data (charge samples) are obtained and stored in memory. Based on these charge samples, a phase relationship between the second laser light and the received reflected light (and optionally also the active brightness for the reflected second laser light) may be determined either by the image acquisition system or the external processor, for example using DFT or correlation function processes as described above.

Using the determined phase relationship between the first laser light and the received reflected light and the determined phase relationship between the second laser light and the received reflected light, phase unwrapping may be performed and a single depth image/frame determined by the memory processor & controller 140 (as will be understood by the skilled person). In this way, any phase wrapping issues can be resolved so that an accurate depth frame can be determined. This process may be repeated many times in order to generate a time series of depth frames, which may together form a video.

Optionally, a 2D IR frame may also be determined using the determined active brightness for the first laser light and the determined active brightness for the second laser light.

A pulsed ToF camera system shall not be described in detail herein. The skilled person will readily understand that a pulsed ToF camera system may be very similar to the system 100, but with the image acquisition components 130, 140 and 150 reconfigured to control pulsed emission from the laser 110 and determine a depth frame based on a time difference between emission of a pulse and reception of reflected light. A 2D IR frame may also be determined based on the magnitude of charge accumulated in the imaging pixels of the image sensor 120.

Figure 3:
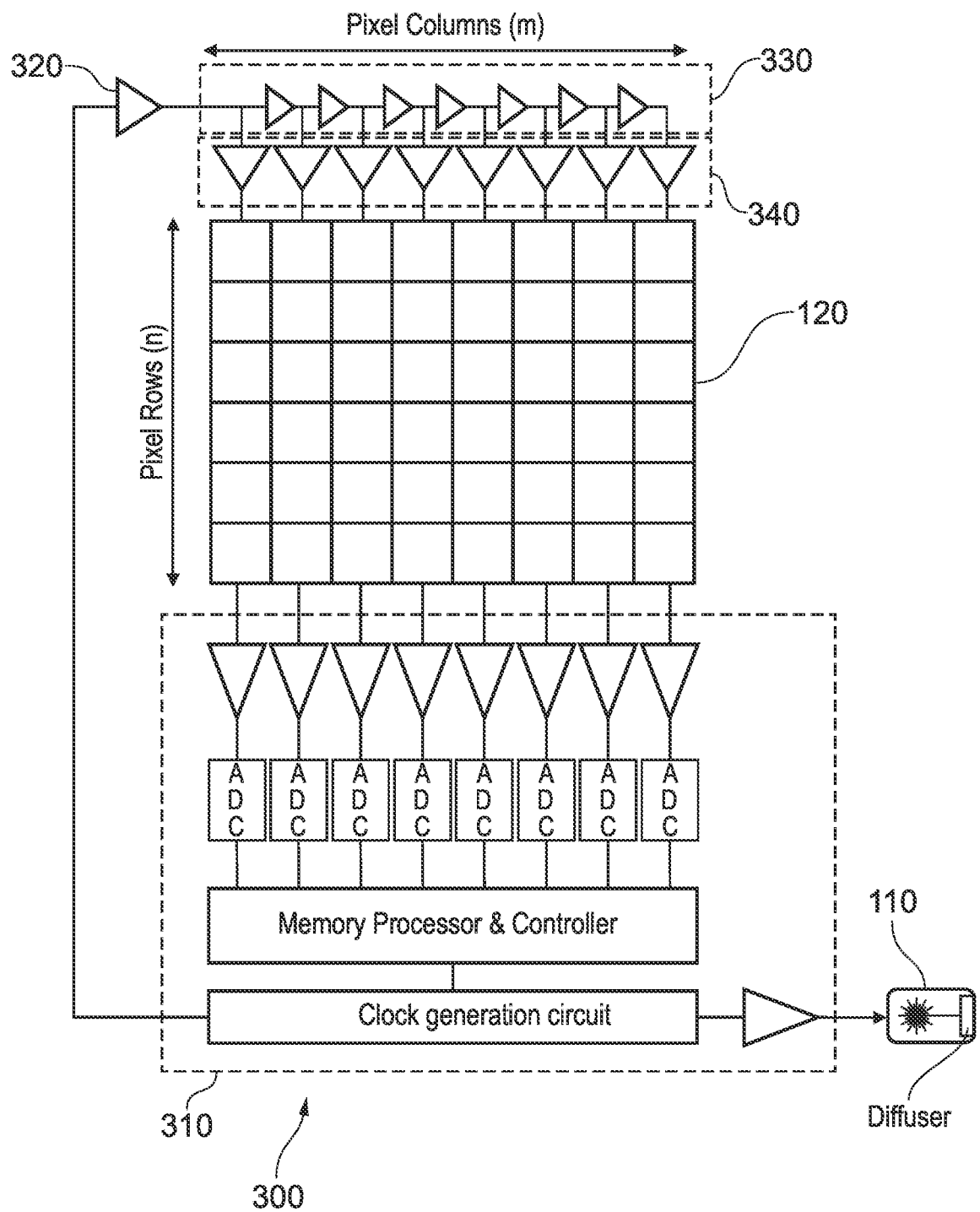
FIG. 3 shows an example representation of a further CW ToF camera system, according to various embodiments of the disclosure.

FIG. 3 shows an example representation of a ToF camera system 300 in accordance with an aspect of the present disclosure. It is configured to be operated in two different modes—a ToF imaging mode or a proximity mode. In the ToF imaging mode, the camera system 300 may operate in either a CW or pulsed mode of operation to determine depth frames and/or 2D IR frames as disclosed above. In the proximity mode, the camera system 300 may operate in a relatively low power mode to perform proximity detection. Proximity detection when used in the context of mobile devices, such as smart phones, may typically measure proximity of objects in the order of centimetres away from the camera system 300, for example objects up to 15 cm away from the camera system 300, such as up to 10 cm away, or up to 8 cm away, or up to 5 cm away, etc. Objects outside of the camera system's 300 maximum range of detection may not be detected by virtue of any one or more of various features, for example the power of emitted laser light may be insufficient to detect more distant objects, or the system may be configured to perform proximity detection only when received light exceeds particular threshold values (as briefly explained later), etc.

The camera system 300 comprises an image acquisition system 310, which in this example is represented as having the same components and arrangement as the camera system 100. However, it may alternatively be implemented in any other suitable way. The image acquisition system 310 controls the operation of the laser 110 and also controls driving of the image sensor 120, both for charge accumulation processes ('demodulation' of the image sensor 120) and readout of the image sensor 120. The camera system 300 comprises an optional demodulation signal driver 320, a delay block 330 and optional signal drivers 340. Whilst the delay block 330 and signal drivers 340 are represented as separate components, some or all of the components may alternatively be implemented to perform a dual delay and drive operation. The image acquisition system 310 is configured to apply a demodulation signal to the image sensor 120 using parts 320, 330 and 340, in order to control the charge accumulation timing of the imaging pixels relative to the timing of the modulation signal with which the image acquisition system 310 drives the laser 110.

In the proximity mode of operation, during an illumination/accumulation period, the image acquisition system 310 may drive the laser 110 with a periodic modulation signal, for example a periodic square wave or sinusoidal signal or alternatively a pulsed signal. The pixel demodulation (or accumulation timing) signal with which the image acquisition system 310 controls the timing of the charge accumulation on the imaging pixels may be based on this laser modulation signal. For example, the demodulation clock driver signal may be configured to instruct charge accumulation for a first portion (such as 0 to π) of the laser modulation signal. In this way, the control may be very similar to that carried out during accumulation period $210_1$ described above.

It is known in some ToF imaging systems to use a delay block 320 to stagger the demodulation signal applied to pixel columns, so that there is an incremental delay in the start and end timing of charge accumulation in columns. In one example, the demodulation signal may be set to control the pixels to accumulate charge during the interval 0 to $\pi/2$ of the laser modulation signal (as explained above in respect of accumulation period $210_1$). That demodulation signal may be used, unaltered, for the first pixel column or a first set of pixel columns (in which case, the column delay of the first pixel column or first set of pixel columns is 0), but for the next pixel column (or next set of pixel columns) a time delay, $t_d$, may be added to the demodulation signal so that the second pixel column (or second set of pixel columns) is controlled to accumulate charge during the interval $\phi_d$ to $\pi+\phi_d$, where $\phi_d$ is the phase delay resulting from the time delay $t_d$. In this case, the column delay of the second pixel column is $t_d$. For the next pixel column (or set of pixel columns), the third pixel column (or third set of pixel columns), a further time delay $t_d$ may be added to the demodulation signal so that the third pixel column (or third set of pixel columns) is controlled to accumulate charge during the interval $2\phi_d$ to $\pi+2\phi_d$, etc. In this case, column delay of the third pixel column (or third set of pixel columns) is $2t_d$. In one example the incremental time delay $t_d$ may be in the order of 10 s (tens) of picoseconds (ps). This is in order to address peak power concerns, preventing a sudden spike in demand on the power source that may affect other components of the device in which the ToF system is operating, and to address parasitic issues in the image sensor 120. The effect of this incremental delay on the pixel sample data read out from the imaging sensor 120 is usually then corrected digitally so that the charge samples appear as they would do if the pixel column accumulation timing were identical for all columns.

However, the inventors have recognised that applying an incremental delay to the pixel columns may in fact result in information within the charge sample data that is useful for the purpose of proximity sensing. Therefore, when operating in the proximity mode, the ToF camera system 300 of the present disclosure is configured not to correct for the column delays, but instead utilise the information that results from the column delays.

Figure 4A:
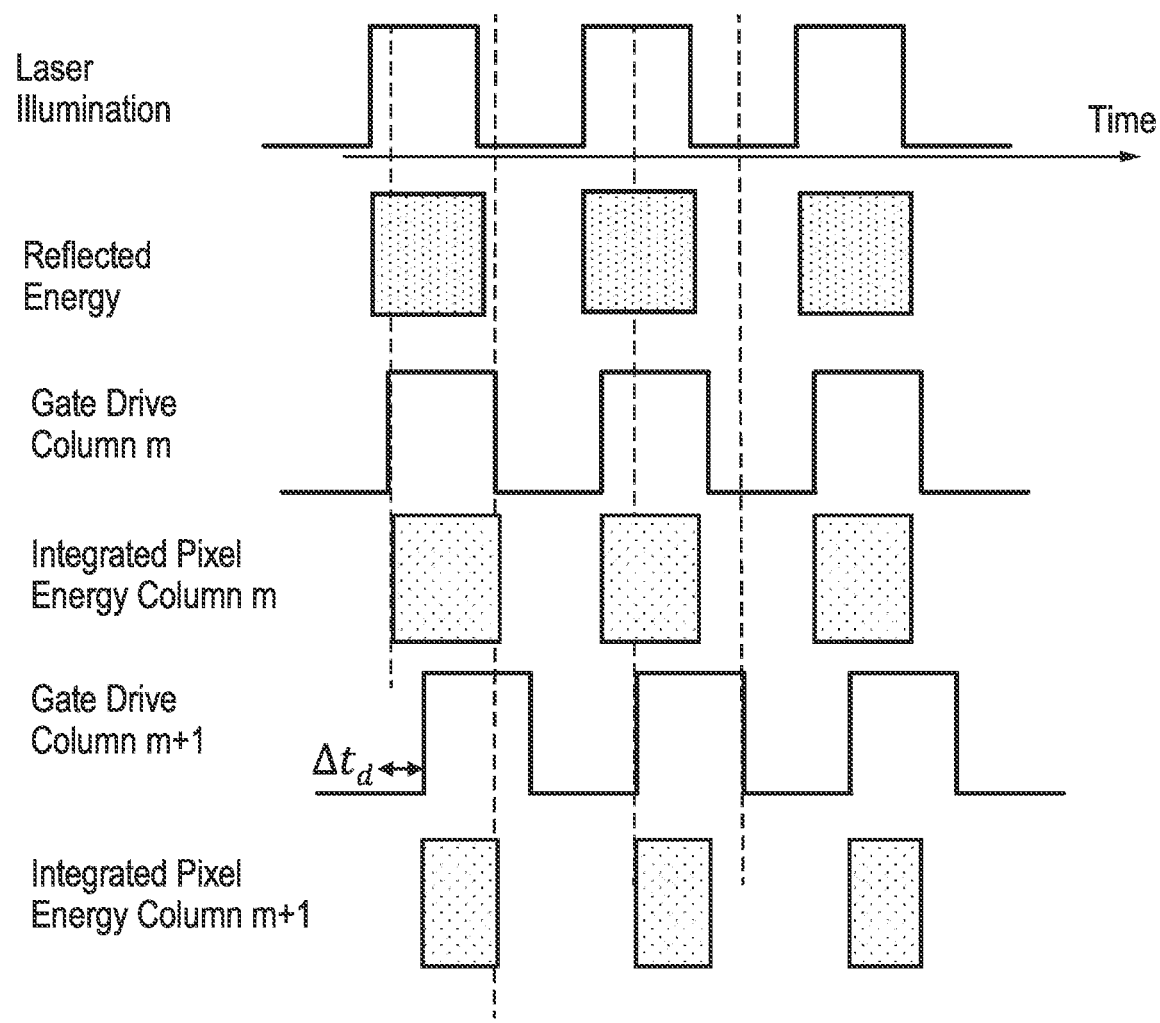
FIG. 4A shows an example timing diagram to visualise the effect of a pixel column delay delay $t_d$, according to various embodiments of the disclosure.

FIG. 4A shows an example timing diagram to visualise the effect of the incremental delay $t_d$. In this example, it is assumed that the object being imaged by the camera system 300 (in this case, a person's head as they hold the camera system 300) is very close to the camera system 300, such that there is only a very small, or effectively zero, time difference between emitting light from the laser 110 and receiving reflected light at the image sensor 120.

In this example, the delay clock 330 has added a delay between the laser modulation signal ('laser illumination') and the accumulation timing for one of the columns (eg, column m) of pixels ('gate drive column 1'). As a result of a further incremental delay $t_d$ for column 2 (eg, column m+1), there is a timing difference equal to $t_d$ between the start of accumulation in the imaging pixels in column 2 compared with column 1. Consequently, the amount of energy accumulated in the imaging pixels in column 1 ('integrated pixel energy column 1') is different to the amount of energy accumulated in the imaging pixels in column 2 ('integrated pixel energy column 2').

As an object, such as a user's head or hand, approaches the camera system 300, it may be coarsely modelled as a flat object. Therefore, the incremental time delay $t_d$ that is applied for each pixel column by the delay block 330 may result in a different amount of photon energy being integrated in each column of pixels for an object that is effectively at the same depth across the columns. The relative amount of photon energy difference between columns when imaging an object that may be assumed to be flat is substantially proportional to the delay applied to each pixel column by the delay block 330.

Figure 4B:
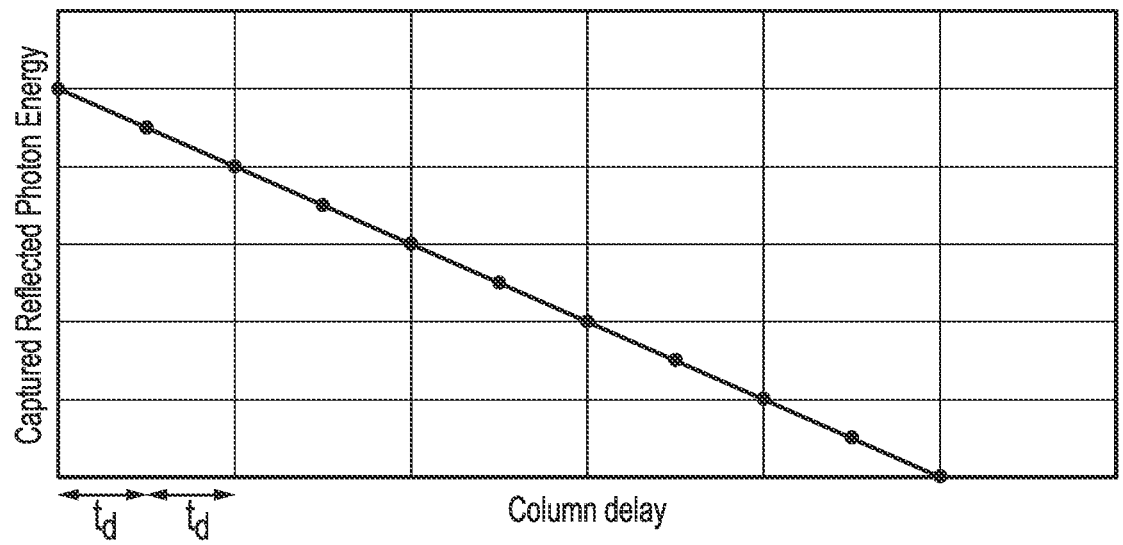
FIG. 4B shows a representation of how captured energy changes with pixel column delay, according to various embodiments of the disclosure.

FIG. 4B shows a representation of this. In this graph, each plotted point corresponds to charge accumulated at a particular a column of the imaging sensor 120. The x-axis shows the column delay of each column, where in this example each column is incrementally delayed by a further amount of time $t_d$ compared with the previous column. However, it should be appreciated that the incremental delay between adjacent pixel columns may be different across the width of the imaging sensor 120 (for example, column 1 may have a column delay T, pixel column 2 may have a column delay of T+$t_d$, pixel column 3 may have a time delay of T+$2.5t_d$, pixel column 4 may have a time delay of T+$1.5t_d$, etc. The y-axis shows the amount of accumulated photon energy in the pixel(s) of a column ('captured reflected photon energy'). Again, in this example it is assumed that the object being imaged by the camera system 300 (in this case, a person's head as they hold the camera system 300) is very close to the camera system 300, such that there is only a very small, or effectively zero, time difference between emitting light from the laser 110 and receiving reflected light at the image sensor 120. Consequently, the column for which no column delay is applied accumulates the most photon energy. With larger column delays, the amount of accumulated energy decreases in a substantially linear fashion.

Figure 5:
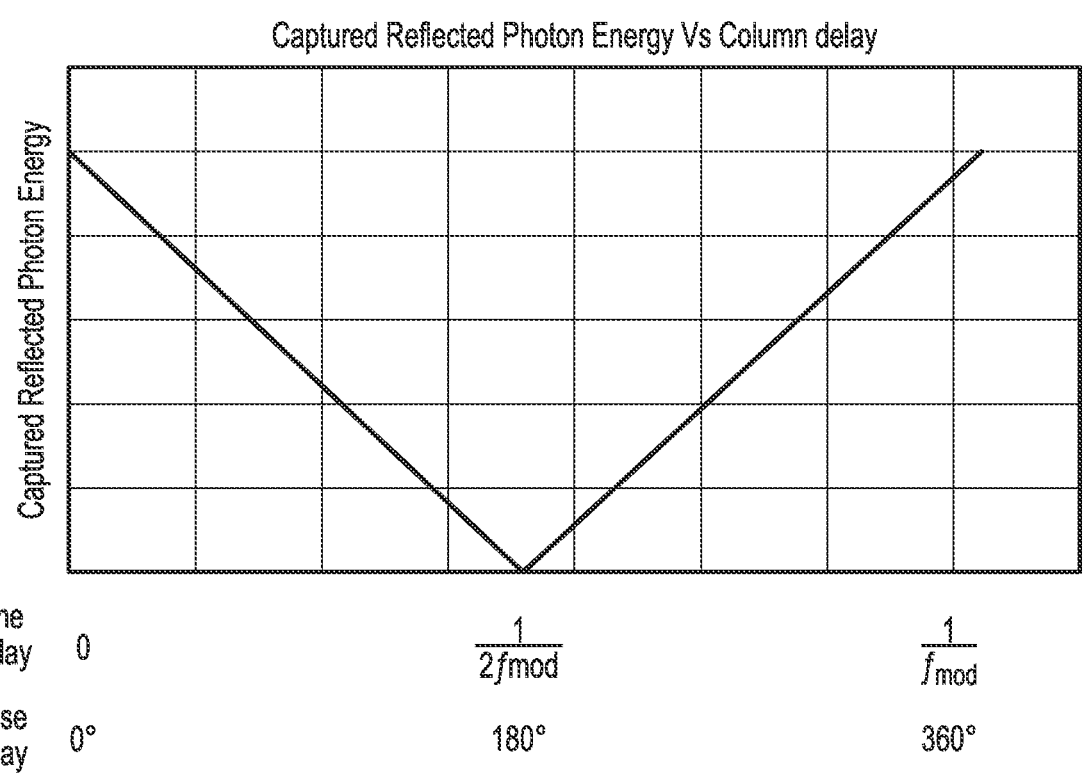
FIG. 5 shows an example of how accumulated pixel energy for each column may change with larger column delays, according to various embodiments of the disclosure.

FIG. 5 shows an example of how the accumulated pixel energy for each column may change with larger column delays. Again, in this example it is assumed that the object being imaged by the camera system 300 (in this case, a person's head as they hold the camera system 300) is very close to the camera system 300, such that there is only a very small, or effectively zero, time difference between emitting light from the laser 110 and receiving reflected light at the image sensor 120. As the phase delay increases to 180°, which is a pixel accumulation timing delay (i.e., a column delay) of $½f_{mod}$ (where $f_{mod}$ is the modulation frequency of the laser light), the amount of accumulated energy decreases towards zero. However, as the total phase delay increases beyond 180° and moves towards 360°, or the pixel accumulation timing delay increases towards $1/f_{mod}$, the amount of accumulated energy starts to increase again. This is because the pixel columns with a column delay of between 180° to 360° start to accumulate some photons reflected by the object from the next laser output pulse.

Figure 6:
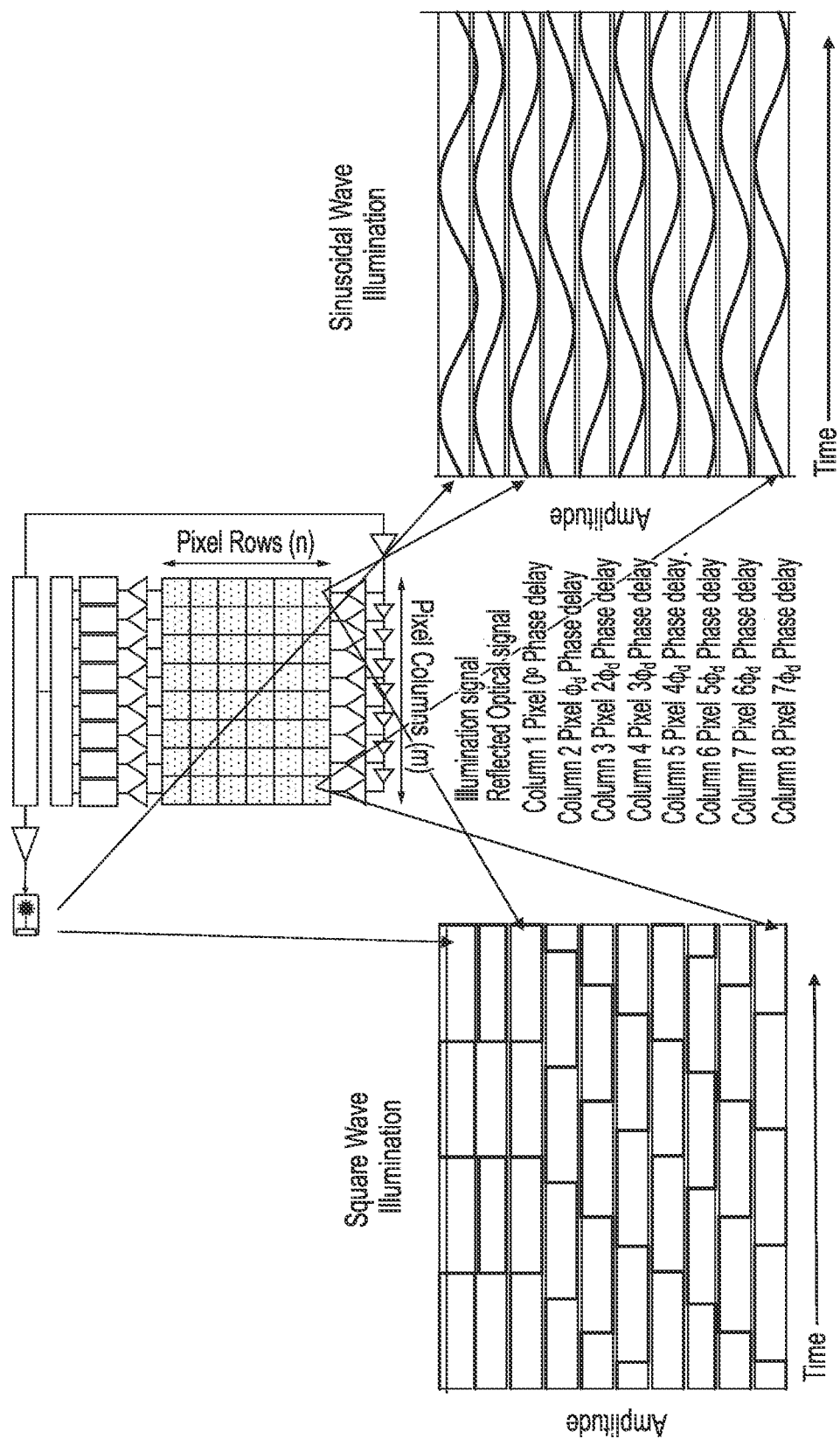
FIG. 6 shows an example of how pixel accumulation timing (e.g., pixel demodulation timing) may be controlled across multiple columns, according to various embodiments of the disclosure.

FIG. 6 shows an example of how pixel accumulation timing (eg, pixel demodulation timing) may be controlled across multiple columns, each with an incrementally different column delay, resulting in an incrementally increasing phase delay of $\phi_d$. Two timing examples are given, one for a square wave laser modulation signal (illumination signal) and another for a sinusoidal laser modulation signal. As can be seen, for column 1 with 0° phase delay, the pixel accumulation control signal (the demodulation signal) is aligned with the laser modulation signal. For each column, an incremental phase/time delay is added to the demodulation signal used by the preceding column, such that the timing of the accumulation control signal shifts for each column across the image sensor 120. This FIG. shows a significant phase shift between adjacent columns in order to emphasise the delay that is taking place, however in practice the delay to each adjacent column is likely to be much smaller.

Figure 7:
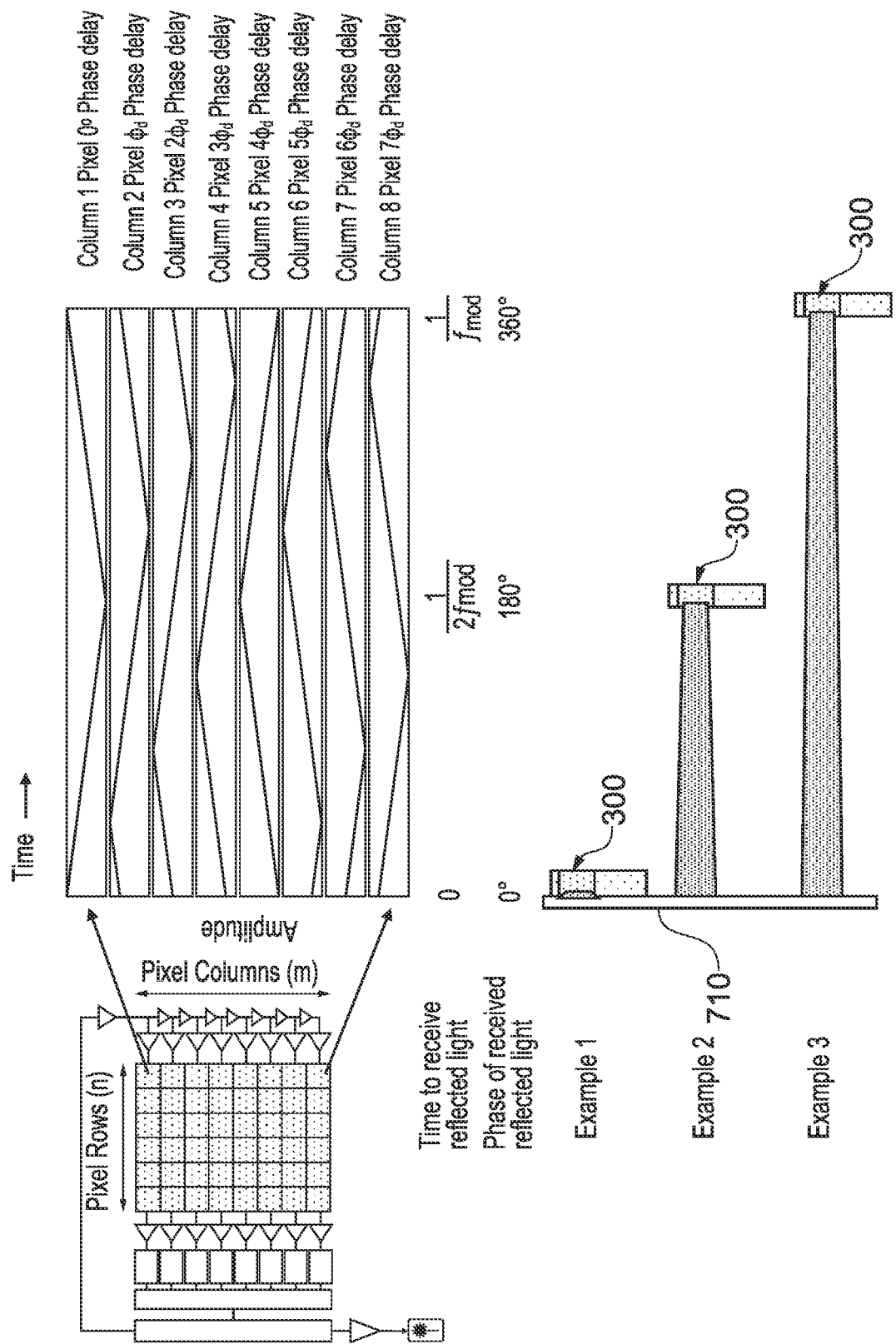
FIG. 7 shows the effect that distance between the camera system and an object from which laser light is reflect has on the amount of charge accumulated in each pixel column, according to various embodiments of the disclosure.

FIG. 7 shows the effect that distance between the camera system 300 and an object 710 from which laser light is reflect has on the amount of charge accumulated in each pixel column. In this example, an incremental delay is applied to the pixel control signal for each column of the image sensor 120, as explained above with reference to FIG. 6. However, the graphs show the amount of charge accumulated in each pixel column ('Amplitude') as the distance between the camera system 300 and the object 710 increases. In this example, a very large incremental phase delay of $\varphi_d=45°$ is used so that the effect can be fully explained with an image sensor 110 having only eight columns. However, in practice image sensors may have many more pixel columns, usually 100 s or 1000 s of columns, so the phase delay $\varphi_d$ may be a lot smaller. As the distance to the object increases, a time difference (or phase difference) between emission of laser light and reception of reflected laser light increases. The relative amount of charge accumulated in each column is dependent on the distance to the object 710 and the column delay of the column.

FIG. 7 shows the camera system 300 at three different distances to the object 710. Example 1 has no distance between the object 710 and camera system 300 such that there is no time difference between emitting light and receiving reflected light. Example 2 shows a distance resulting in the time difference between emitting light and receiving reflected light being $\frac{1}{2}f_{mod}$ (equivalent to a phase difference of 180° between emitted and received light). Example 3 shows a distance resulting in the time difference between emitting light and receiving reflected light being $1/f_{mod}$ (equivalent to a phase difference of 360° between emitted and received light).

As can be seen, in example 2 the maximum charge accumulation is in column 5 and the minimum charge accumulation is in column 1. When the object 710 is at a distance resulting in a time to receive reflected light of approximately $3/(4f_{mod})$, the maximum charge accumulation would be in column 7 and the minimum charge accumulation would be in column 3. Therefore, by determining where the maximum and/or minimum charge accumulation is across the columns, it is possible to determine the distance to the object 710.

For example, the maximum charge accumulation may be in column 3. We know that the column delay applied to column 3 is $1/(4f_{mod})$. In this example we also know that when the object is 0 distance (the 'known distance' in this example—explained later), the maximum charge accumulation is in column 1, which has a column delay of 0 (the 'predetermined delay time'—this the delay time corresponding to the maximum charge accumulation when the object is at a known distance. The known distance and predetermined delay time may be set during device calibration, as explained below). The difference between the column delay of column 3 and the predetermined delay time is $1/(4f_{mod})$. This is referred to from hereon as the "time delay difference". From this the spatial difference between the proximity of the object being detected and the known distance used during calibration can be determined. In this example it would be a spatial difference of $c/(8f_{mGd})$, where c=speed of light since distance=(c×time delay)/2. Since the known distance in this example is 0, if then follows that the proximity of the object 710 is $c/(8f_{mod})$.

In this example, the known distance to the object used during calibration is 0, which results in a 'predetermined delay time' of 0 (i.e., the maximum charge accumulation would take place in a column with a delay of 0). However, the known distance may be any other suitable distance. For example, during calibration an object may be positioned at a distance of $c/(4f_{mod})$, which results in the maximum charge accumulation being at column 5, having a column delay of $1/(2f_{mod})$. Therefore, the predetermined delay time would be $1/(2f_{mod})$. In the earlier described example where during proximity mode operation of the camera system 300 (i.e., post-calibration operation 'in the field') the object is at a distance resulting in column 3 having the maximum charge accumulation, the difference between the column delay of column 3 and the predetermined delay time would be $1/(4f_{mod})-1/(2f_{mod})=-1/(4f_{mod})$.

This equates to a difference between the known distance used during calibration and the proximity of the object of $-c(8f_{mod})$. Finally, the proximity of the object 710 may be found by adding the known distance ($c/(4f_{mod})$) to the difference between the known distance and the proximity of the object of ($-c(8f_{mod})$), which in this case equals $c/(8f_{mod})$. Therefore, it can be seen that the same value for proximity to the object 710 may be reached regardless of the known distance used during device calibration.

It should further be noted that in this example the maximum charge accumulation is significant. However, the same process may equally be used by considering the minimum in charge accumulation. In particular, the predetermined delay time may be set during calibration as the delay time corresponding to the minimum charge accumulation. This may then be compared during device operation to the delay time corresponding to the minimum charge accumulation in the charge sample readout from the imaging sensor 120. Consequently, it can be seen that the process may use either maximum or minimum charge accumulation. The terminology 'extremum' will typically be used from hereon, which could be the maximum or minimum depending on device configuration.

Figure 8:
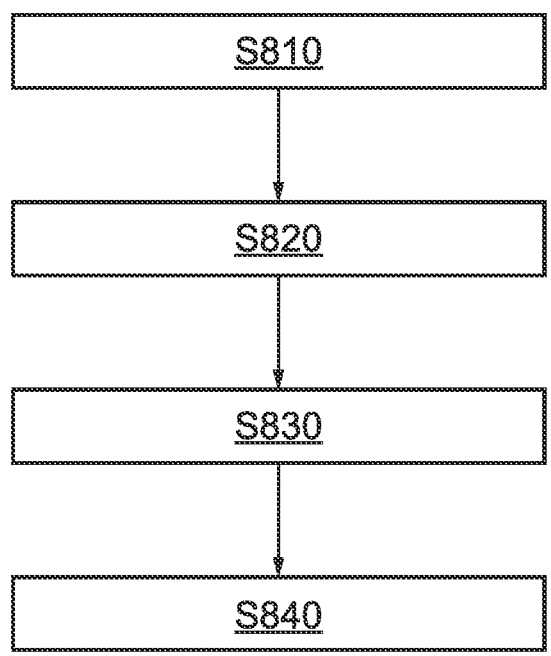
FIG. 8 shows example a representation of the steps of a method of the camera system of FIG. 3 operating in the proximity mode, according to various embodiments of the disclosure.

FIG. 8 shows example a representation of the steps of a method of the camera system 300 operating in the proximity mode to determine the proximity of the object 710. It should be appreciated that the camera system 300 has already been calibrated such that the predetermined delay time has already been set. Optionally, the predetermined time delay and/or known distance may be stored in memory on the camera system 300. However, it is not essential to store these values, for example if the known distance is 0 and predetermined delay time is 0.

In step S810, the image acquisition system 310 controls light emission of the laser 110 using a laser drive signal. The laser drive signal is modulated with a modulation signal, which may be a square wave or sine wave in the case of a CW-ToF camera system, or a pulse signal in the case of a pulse based ToF camera system.

In Step S820, the image acquisition system 310 controls the timing of charge accumulation in the imaging sensor using the demodulation signal. The timing of the demodulation signal is based on the modulation signal used for the laser drive signal, as explained earlier (for example, controlling pixel accumulation to take place during the interval 0 to 90° or 90° to 180°, etc in the case of a CW-ToF system, or to take place for a predetermined period of time commencing at or soon after the beginning of a laser pulse emission in the case of a pulse based ToF camera system).

As explained earlier, the delay block 330 applies a column delay to the demodulation signal for at least some of the pixels of the imaging sensor, such that the start and end timing of charge accumulation is different between at least some of the plurality of pixel columns that are read out in Step S830.

In Step S830, after a period of laser illumination and charge accumulation (for example, after period $210_1$ described above), the image acquisition system 310 reads out a charge sample from one or more pixels in each of a plurality of pixel columns. As explained later, optionally charge from only some pixel columns may be readout, or charge from all pixels may be readout. As explained earlier, the amount of charge accumulated in each of the readout pixel columns is dependent on the proximity of the object 710 and the column delay of the pixel column. Therefore, by knowing the column delay of each column and looking at the read out charge sample that is indicative of the charge accumulated in a plurality of columns, it is possible to determine the proximity of the object 710.

In Step S840, the image acquisition system 310 determines the proximity of the object based on the readout charge sample and the column delays applied by the delay block 330. One example technique for this is described above with reference to FIG. 7. That technique provides a relatively quick and coarse measurement of proximity as it assumes that the extrema of charge accumulation takes place at a delay time that is exactly equal to a column delay. However, other techniques may be used by the image acquisition system 310 to determine a more precise delay time corresponding to an extrema of charge accumulation, which in turn results in a more accurate determination of proximity.

Figure 9:
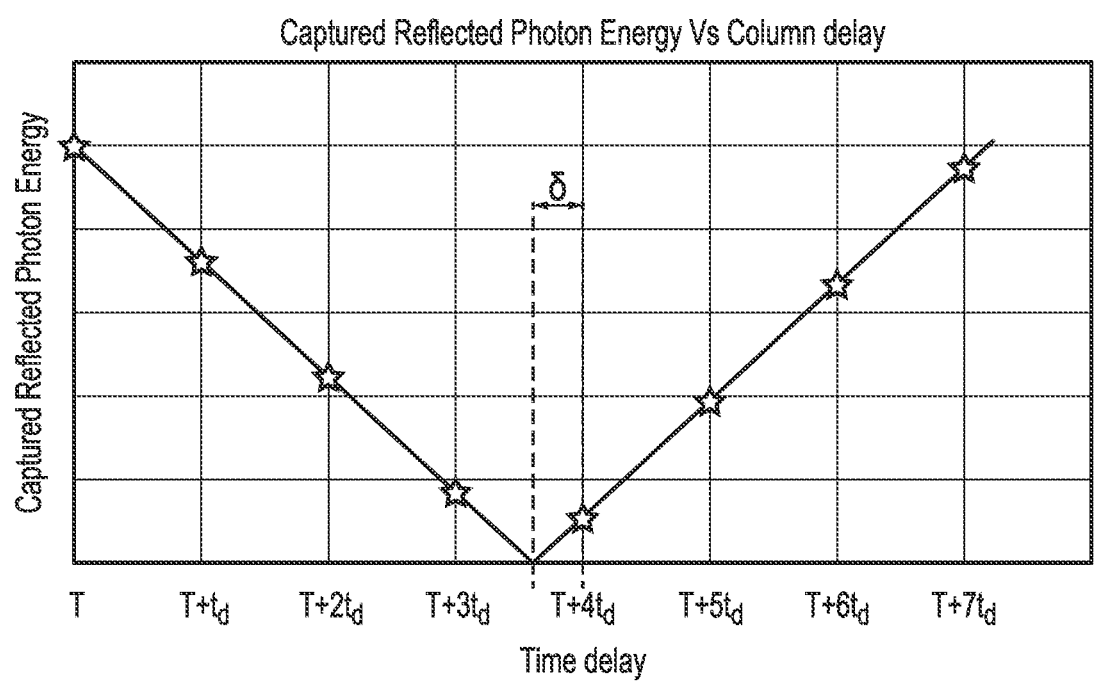
FIG. 9 shows a representation of charge accumulated by pixels in each of a plurality of columns, according to various embodiments of the disclosure.

FIG. 9 shows a representation of charge accumulated by pixels in each of a plurality of columns n to n+7. In this example we focus on the extremum being the minimum, but the same principles apply equally to the maximum. As can be seen, the lowest charge value is at column n+4. However, we can see there is a function that describes a relationship between the read out charge sample and the time delay. In this example the function is discontinuous with two straight lines passing through the values of charge accumulation for each pixel column, which may be determined by performing any suitable form of statistical processing on the read out charge sample, for example linear interpolation, non-linear interpolation, etc. In effect, the function represents what would happen if we had an infinite number of columns and with a tiny time delay $t_d$. It can be seen that the minimum of the function does not occur at a time delay equal to a column delay, but at a time that is between column delays. Many techniques may be used to identify the time delay corresponding to the minimum.

In one technique, the smallest charge accumulation in the charge sample is identified, in this case the value for column n+4, along with the associated column delay, in this case $T+4t_d$.

The time value δ (see FIG. 9) is then identified from the following formula:

$$\delta = t_d * (0.5 - (\text{next}-\text{prior})/(2*\Delta))$$

where next=the charge accumulation at the column that is likely to be immediately after the minimum in the function (in this case column n+4)

prior=the charge accumulation at the column that is likely to be immediately before the minimum in the function (in this case column n+3)

Δ=the typical difference between charge accumulation values in adjacent pixel columns.

'Next' and 'Prior' may be determined by finding the lowest charge accumulation value in the charge sample and considering the relative size of charge accumulation in its two neighbouring columns. In this case, the charge of column n+3 is lowest than n+5 and as such n+3 is 'prior' and n+4 is 'next'. If the charge of column n+3 were higher than n+5, then n+4 would be 'prior' and n+5 would be 'next'.

The value of Δ may be found in any suitable way, for example by averaging some of all of the differences of charge accumulation between adjacent pixel columns.

In a further alternative technique, the extremum may be found even more accurately, but with greater processing requirements.

Figure 10:
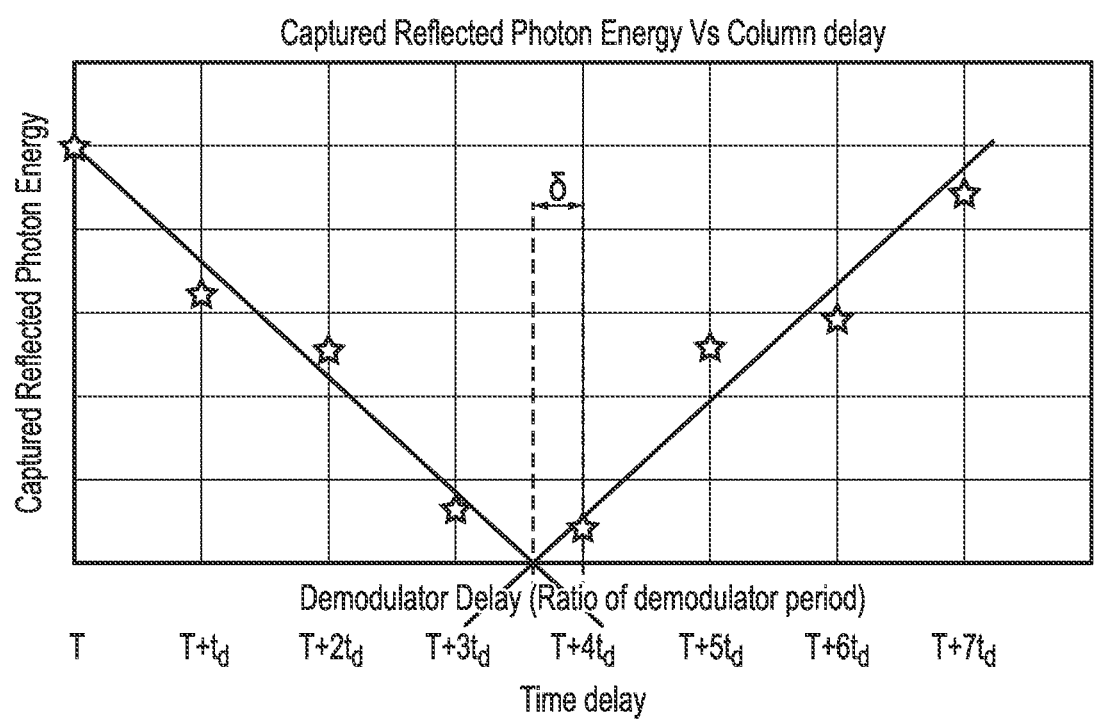
FIG. 10 shows a further representation of charge accumulated by pixels in each of a plurality of columns, according to various embodiments of the disclosure.

FIG. 10 shows a representation that is similar to FIG. 9 but in this example the charge accumulation of each column does not exactly fit a straight line. This is likely to be the case for all of the examples herein unless the object 710 is perfectly flat and there is no noise. However, at close distances the object 710 may reasonably be approximated as flat (particularly if the camera system 300 is being implemented in a mobile device to determine the proximity of a human face close to the camera system 300), so a linear line of best fit may be used, which also increases robustness to noise.

In this example, the accumulation values representing a descending segment (in this example, the left side of the graph) are identified (using any standard statistical processing technique) and are used to define a straight line approximation, for example using any standard linear regression technique. The same may be done for an ascending segment (in this example the right side of the graph).

The linear fit of the descending segment may be described by:

$$y_d = \alpha x + \beta$$

and the linear fit of the ascending segment may be described by:

$$y_a = \varepsilon x + \mu$$

At the point of intersection, $y_d = y_a$ and x is equal, so:

$$\alpha x + \beta = \varepsilon x + \mu$$

$$x = (\beta - \mu)/(\varepsilon - \alpha)$$

Therefore, the time delay, x, corresponding to the minimum can be found from the two linear lines of best fit. Furthermore, if we assume that the gradient of both slopes is equal, which is a reasonable assumption if there is limited noise in the system, this is even further simplified to $x = (\beta - \mu)/(2\varepsilon)$.

Thus, it can be seen from the above explanations that the charge sample readout from the imaging sensor defines a function describing a relationship between accumulated charge and delay time applied to the demodulation signal. That function typically has a discontinuity at each extremum and as such may be approximated by a plurality of linear functions that intersect at each extremum. A delay time corresponding to an extremum of the function can be found in many different ways, for example assuming that the highest/lowest charge sample value is an extremum, or by performing the techniques described with respect to FIGS. 9 and 10. After determining the delay time corresponding to an extremum, the proximity of the object 710 may be determined, for example by determining the time delay difference that is the difference between the delay time corresponding to the extremum and the predetermined delay time, as described above.

Figure 11:
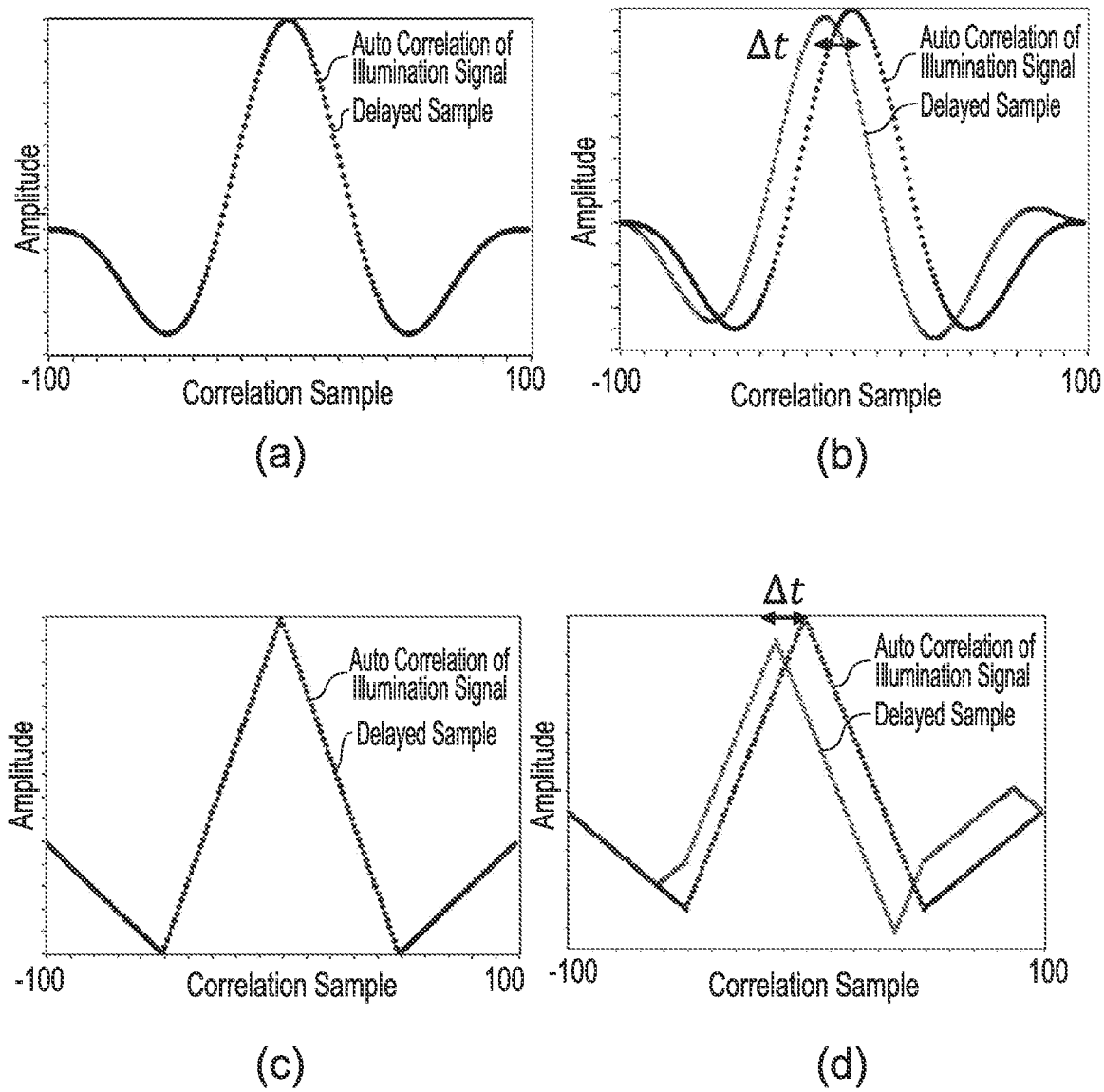
FIG. 11 shows example graphical representations of correlation techniques used to determine the proximity of an object, according to various embodiments of the disclosure.

FIG. 11 shows graphical representation to aid in the explanation of an even further technique that may be used by the image acquisition system 310 to determine proximity of the object 710 (i.e., proximity detection) when accumulation timing delays are applied to the columns of the image sensor 120 as described above. Graphic (a) represents a situation where the laser light is modulated with a sinusoidal signal and the object being detected is at zero distance from the camera system 300. There is a representation of a digital autocorrelation of the modulation signal used for the laser (i.e., a sampled correlation of the modulation signal with itself) and another representation of a digital correlation of the values in the charge sample readout from the imaging sensor 120 with the modulation signal. The two separate representations are not very visible in this example because they overlap. Each dot represents a sample value, such that each dot in the curve labelled "delayed sample" represents a charge accumulation value of an imaging pixel in the image sensor 120 that has been digitally correlated with the modulation signal. As can be seen, in this example there are a relatively large number of values readout from the image sensor, each from a column with a different column delay (i.e., each of the plurality of columns that are readout has a different column delay).

Graphic (b) represents a situation where the laser light is modulated with a sinusoidal signal and the object 710 is at a non-zero distance from the camera system 300. As above, there is one representation of a digital autocorrelation of the modulation signal and another representation of a digital correlation of the charges readout from the imaging sensor 120 with the modulation signal. The shape of the autocorrelation and the correlation are very similar, but are shifted relative to each other. The amount of the shift (for example, the shift in position of the extrema of the two autocorrelations) is the time delay difference (represented as Δt in the FIG.), which is the difference between the delay time corresponding to an extrema of the readout charge sample and the delay time corresponding to the extrema of the charge accumulated during calibration when the object is at the known distance. Since the difference between each point of the correlation is known—it is the incremental delay $t_d$—the time delay difference can be straightforwardly determined using this technique. As explained earlier, the time delay difference represents the distance of the object 710 relative to the known distance, from which the proximity of the object can be easily determined (as explained earlier). Therefore, based on a comparison of the two correlations, the proximity of the object 710 to the camera system 300 may be determined. That comparison may be a comparison of the position of one or more extrema in the correlations, or it may be a comparison of the position of any other point(s) in the correlations (for example, a comparison of the x-axis position(s) at which the correlation is equal to a particular value).

Graphic (c) is very similar to graphic (a), and graphic (d) is very similar to graphic (d), except for graphics (c) and (d) represent the autocorrelation and correlation signals when the laser modulation signal is a square wave signal.

In the above explanations, an autocorrelation of the modulation signal is compared with a cross correlation of the modulation signal and the signal represented by the charge sample readout from the imaging sensor. This may have the benefit of combining the information of all sample points so that any noise (for example, Gaussian noise) is smoothed out.

However, in an alternative the charge sample readout from the imaging sensor 120 may be cross correlated with the signal obtained during calibration when the object is at a known distance (i.e., cross correlated with the charge samples obtained during calibration when the object is at the known distance). The position of an extrema in the cross correlation may indicate the measured distance of the object relative to the known position, from which the proximity of the object can straightforwardly be obtained. For example, if the number of column readout is N, the length of the cross correlation is 2N−1. If the peak of the cross correlation is at position N (i.e., centred in the correlation), it means that the two signals that have been cross correlated are synchronised so the object being measured is at the known distance. If the peak is at position N+2.6, it is known that the time delay difference is $2.6t_d$, from which the proximity can be determined as described earlier.

In the above it is typically assumed that all of the sampled imaging pixels of the camera system 300 are imaging the same single object 710. However, sometimes some of the sampled imaging pixels may be imaging a first object at a first distance from the camera system 300, and other sampled imaging pixels may be imaging a second object at a second distance from the camera system 300. To address this, the distance may be determined using the above described technique by first identifying groups of pixels that appear to be imaging the same surface. This may be achieved by first considering the shape of the function defined by the charge samples and/or the correlation function (i.e., the dots in the function labelled "delayed sample") to identify groups of imaging pixels that appear to be imaging an object at the same distance (for example, groups of samples that together define the linear trends represented in FIGS. 9 and 10, or that have a correlation function shape that is similar to the autocorrelation function shape, etc). The values of only those identified pixels may then be used to perform the processes described above to determine the object distance. This may be repeated for each group of pixels identified and the image acquisition system 330 may be configured to use the information in any suitable way, for example setting the proximity as the shortest identified distance.

In a further aspect of the disclosure, a distance (proximity) between the camera system 300 and an object 710 (i.e., proximity detection) may be determined in Step S840 using a Discrete Fourier Transform (DFT) technique. In this example, a demodulation signal timing delay is applied across columns of the imaging sensor 120 as described above with reference to FIGS. 3-7. For the charge samples readout from the image sensor 120, a DFT $\hat{V}[k]$ of V(pixel i) may be determined as follows:

$$\hat{V}[k] = \sum_{n=0}^{N-1} V(\text{pixel } i) e^{-j2\pi \frac{kn}{N}}$$

$$\hat{V}[k] = \sum_{n=0}^{N-1} V(\text{pixel } i) e^{-j2\pi \frac{kn}{N}} \left[ \cos\left(\frac{2\pi kn}{N}\right) - j\sin\left(\frac{2\pi kn}{N}\right) \right]$$

$$\hat{V}[1] = V(\text{pixel } 1) e^{-j2\pi \frac{0}{8}} + V(\text{pixel } 2) e^{-j2\pi \frac{1}{8}} + V(\text{pixel } 3) e^{-j2\pi \frac{2}{8}} + \ldots \ldots \ldots$$

A depth to the object 710 may be determined from the phase of the fundamental frequency relative to the laser modulation signal. Additionally or alternatively, an active brightness (2D IR) of the object may be determined from a magnitude of the fundamental frequency. For example, the phase may be determined as follows:

$$\text{Phase} = -\angle\hat{V}[1] = -\operatorname{atan}\frac{\mathcal{I}m(\hat{V}[1])}{\mathcal{R}e(\hat{V}[1])}$$

The phase of the DFT is indicative of a time difference between the transmission of laser light and the reception of reflected light, and therefore indicative of the distance.

The magnitude of the fundamental frequency may be determined as follows:

$$\text{Magnitude} = |\hat{V}[1]| = \sqrt{\mathcal{R}e(\hat{V}[1])^2 + \mathcal{I}m(\hat{V}[1])^2}$$

In each of the different proximity detection techniques described above, a relatively small sub-set of imaging pixels may be readout from the imaging sensor 120 and used for proximity detection, which should significantly reduce power consumption when operating in the low-power proximity mode. However, the scene being imaged by the image sensor 120 may not be of a single object with a flat surface (or surface that can be approximated as flat), but may instead be of multiple objects all at different depths. If the sampled pixels are actually imaging multiple objects at different depths from the camera system 300, the determined proximity and/or active brightness may not be reliable.

Optionally, the image acquisition system 310 may be configured to determine two or more estimates of proximity, each using samples from a different sub-set of imaging pixels, with a final proximity being determined from the estimates, for example based on one or more of: clustering, ranking and/or averaging.

Figure 12:
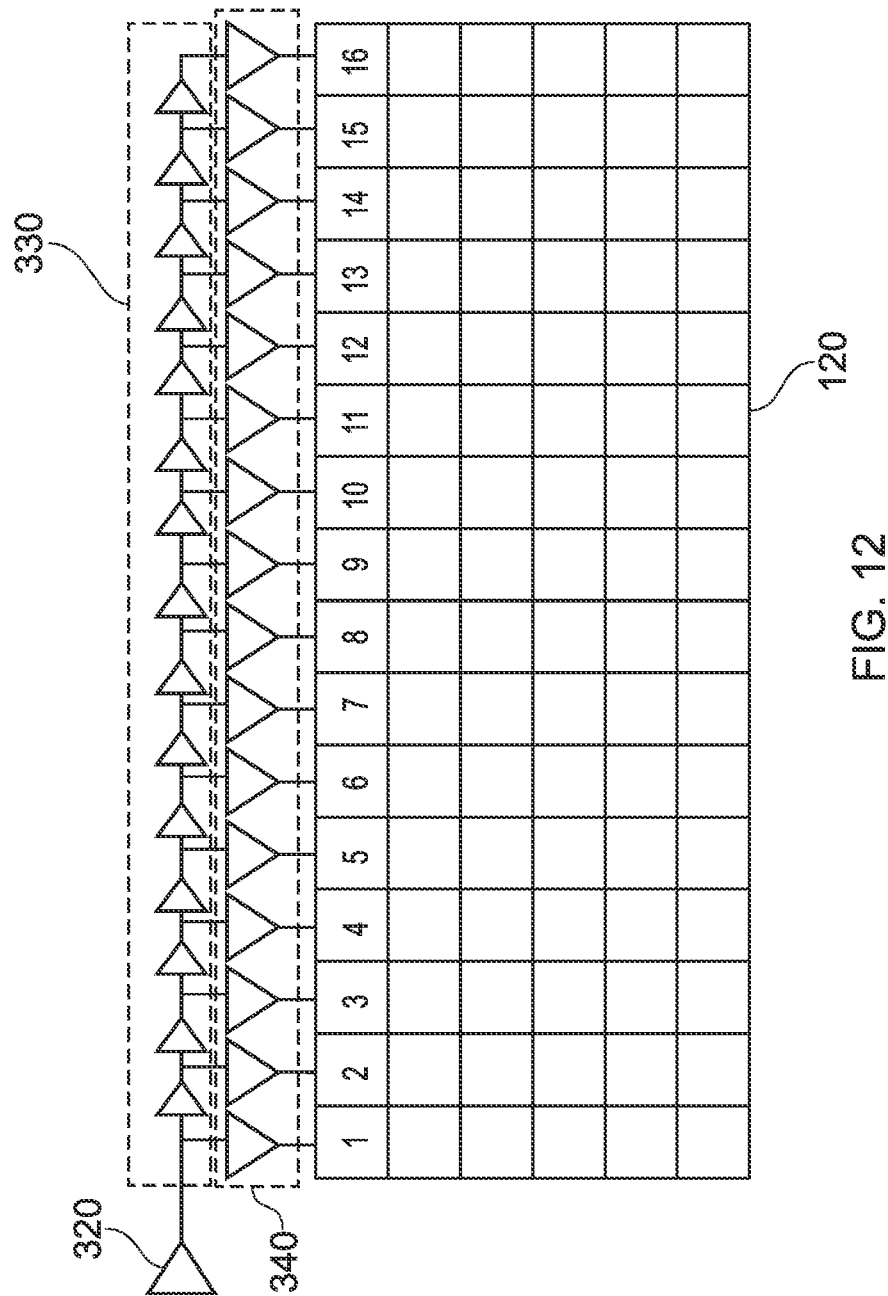
FIG. 12 shows an example of the image sensor where there are 16 columns, according to various embodiments of the disclosure.

FIG. 12 shows an example of the image sensor 120 where there are 16 columns. A delay is incrementally applied to the charge accumulation control signal (demodulation signal) across the columns as explained above. In this case, a first proximity estimate may be determined based on charge readout from a first sub-set of pixels 1-8, a second estimate of proximity may be determined based on charge readout from a second sub-set of pixels 2-9, a third estimate of proximity may be determined based on charge readout from a third sub-set of pixels 3-10, etc. Therefore, a single accumulation period and readout period may be performed (eg periods 210$_1$ and 220$_2$ described earlier), where during the readout period charge may be readout from a particular set of imaging pixels (for example, pixels 1-12 in one row). A plurality of estimates of proximity may then be determined from a plurality of different subsets of columns that readout sample charges. Those estimates may then be used to arrive at a single value of proximity, for example by performing clustering to identify which estimates appear to relate to imaging the same object 710 at the same depth (for example, identify the estimates that are all similar) and then determining the final depth from those estimates, for example by averaging or ranking.

In this example, the readout charge samples are all from imaging pixels in the same row, such that each subset is also from the same row. However, the readout charge samples may be from anywhere in the image sensor 120.

Figure 13:
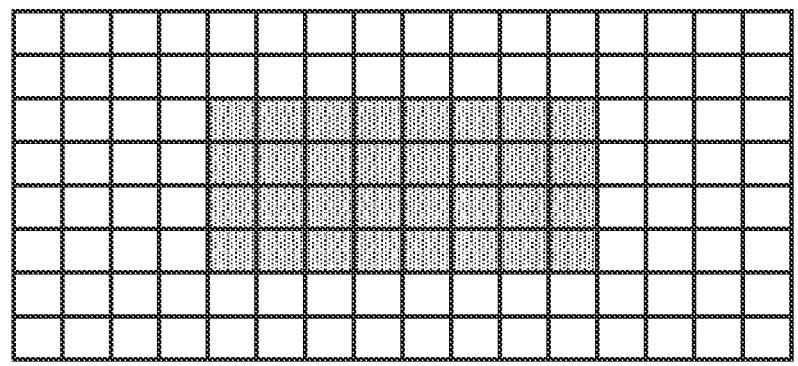
FIG. 13 shows some different, non-limiting examples of imaging pixels that may be readout, according to various embodiments of the disclosure.
Figure 13:
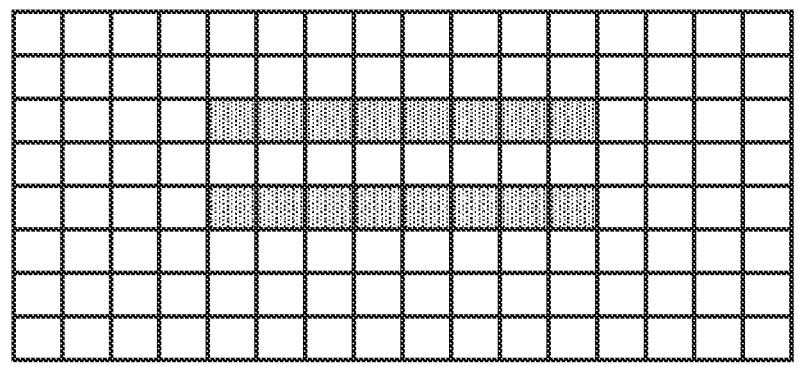
Figure 13:
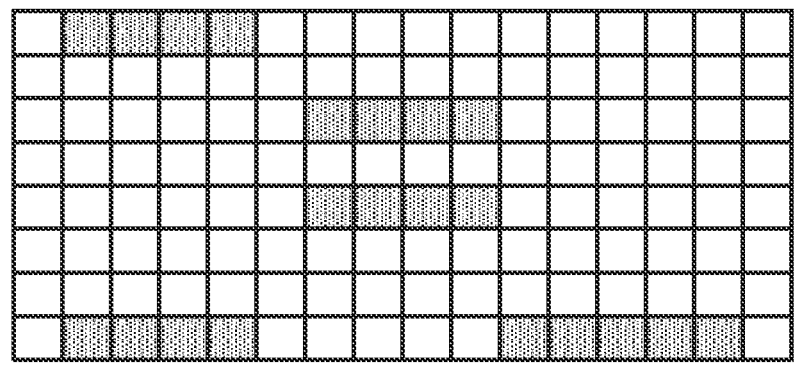

FIG. 13 shows some different, non-limiting examples of imaging pixels that may be readout. The imaging pixels that are readout are highlighted, and a plurality of different sub-sets may be taken from the readout charge sample and the plurality of estimates of proximity determined based on those sub-sets. In this way, the camera system 300 may be configured to sample different regions of the image sensor 120 when operating in the proximity mode, depending on the requirements of the proximity sensing. For example, just a central section may be sampled (example (a)) if it is expected that the main object to be detected is likely to be imaged around the centre of the image sensor 120. In this case four different estimates of proximity, for example, may be determined, one from each row. Alternatively, one or two estimates of proximity may be determined, for example by binning two or four pixels of each column. Alternatively, more than four estimates of proximity may be determined, for example by subdividing one or more rows into two or more sub-sets, each having two or more pixels from different columns. Alternatively, groups of pixels from different parts of the image sensor 120 may be readout during the single readout period (examples (b) and (c)) and used to determine a plurality of estimates of proximity.

In each of the different aspects of the proximity mode of operation disclosed above (for example, in the context of FIGS. 3-13), it will be appreciated that a depth/distance determination to an object may be made using a single accumulation period and a single, subsequent readout period. The laser 110 may be modulated using either a pulsed modulation signal or a continuous wave modulation signal, and the accumulation period may last for long enough to include one or more periods of the modulation signal (a plurality of periods may be useful for increasing the amount of charge accumulated, and therefore the accuracy of the distance determination). As a result, the camera system 300 can be operated in a proximity mode of operation that is faster and consumes less power than the full ToF (depth frame and/or 2D IR frame) mode of operation described with reference to FIG. 2. Optionally, in the proximity mode of operation, the accumulated charge from only some of the imaging pixels may be readout during the readout period, which may even further reduce energy consumption. In the proximity mode of operation, the accuracy of the distance determination may be reduced compared with that achieved by the full ToF mode, but reduced accuracy is likely to be acceptable for proximity sensing purposes. Therefore, a single ToF camera system may be used both for low-power proximity sensing and also depth frame/2D IR frame determination, thereby reducing the number of components needed by a device that requires both proximity sensing and depth frame/2D IR frame determination.

The ToF camera system 300 may be configured to switchably operate in either the low-power proximity mode or the higher-power ToF mode when depth frames and/or 2D IR frames are to be determined. For all described aspects above, the delay block 330, 1230 may optionally be programmable or adjustable, such that the incremental delay $t_d$ applied to each column may be changed. For example, the column delays may be set to 0, or to relatively short delays, when operating in the high-power ToF mode, and may be set to any suitable value(s) of $t_d$ when operating in the proximity mode. Alternatively, the delay block may have fixed delays and the image acquisition system 310 may optionally be configured to bypass the delay block when operating in the ToF mode, or digitally to correct for the consequences of the incremental delays $t_d$, whereas the proximity mode of operation makes use of the consequences of the incremental delays.

Optionally, the image acquisition system 310 may be configured to interface with other devices differently during the proximity mode. For example, it may use a relatively low speed interface (such as 12C or GPIOs) to send charge samples to an application processor during the proximity mode and a high speed interface (such as high speed MIPI) during the ToF mode. This may reduce power consumption even further, particularly if the high speed interface is powered down when not in use.

Switching between the proximity mode and the ToF mode (and a turned-off mode) may be controlled according to any suitable means. For example, the image acquisition system 310 may switch based on received control signals. For example, the image acquisition system 310 may usually be in an off, or sleep, mode and be switched to the proximity mode by a trigger signal, for example from an inertial sensor. Alternatively, it may alternate between an off, or sleep, mode and the proximity mode according to an inbuilt cycle. That duty cycle may have a relatively low frequency, for example 10 Hz, 20 Hz, 50 Hz or 100 Hz, etc (i.e., proximity sensing performed 10, 20, or 50 or 100 times per second), since quickly detecting changes in proximity of objects may not be important for a proximity sensor. It may then switch to ToF imaging mode if a nearby object is detected (i.e., an object is determined to be within a predetermined proximity), or if instructed by some other module/device to switch.

Throughout this disclosure, the term "electrically coupled" or "electrically coupling" encompasses both a direct electrical connection between components, or an indirect electrical connection (for example, where the two components are electrically connected via at least one further component).

The skilled person will readily appreciate that various alterations or modifications may be made to the above described aspects of the disclosure without departing from the scope of the disclosure.

For example, when in the proximity mode of operation, all pixels may be controlled to accumulate charge and subsequently some or all pixels may be readout. Alternatively, the image acquisition system 310 may control only some of the pixels to accumulate charge and subsequently some or all of those pixels may be readout. Supporting circuitry for the other, non-accumulating pixels, may optionally be powered down or operated in a low-power mode. In this way, power consumption may be even further reduced.

Optionally in proximity mode, the illumination power of the laser 110 may be reduced compared with the ToF mode, for example by controlling the laser 110 to be driven with reduced current. This may even further reduce power consumption.

Optionally in proximity mode, readout circuitry (for example amplifiers and/or ADC) may be operated in low power mode, trading off accuracy for power consumption. This may even further reduce power consumption.

Optionally in proximity mode, the modulation signal applied to the laser 110 may be lower frequency than used during the ToF mode. This may even further reduce power consumption. Furthermore, it will be appreciated that phase unwrapping may not be performed during proximity mode operation, since the laser light 110 is not modulated at two different frequencies for different accumulation periods (as described earlier with reference to FIG. 2). However, proximity sensors are typically only required to detect proximity within a relatively short range, for example within 1-2 metres of the camera system 300, or up to about 15 cm in the case of mobile devices such as smartphones. Therefore, the frequency of the modulation signal may be set such that phase wrapping should not occur for objects within the designed range of the proximity mode of operation (for example, objects within 1 metre or two metres of the camera system 300). Optionally, the image acquisition system 300 may also be configured to consider the magnitude of sampled accumulated charge when determining proximity in order to exclude charge samples from pixels that are likely to have been imaging an object outside of the designed range of the proximity mode. The further an object is from the camera system, the lower accumulated charge will be on the image sensor 120 for an image of the object. Therefore, the image acquisition system 300 may have a minimum threshold amount of charge that corresponds to imaging an object at the limit of the designed range. If the charge sampled from a pixel(s) during the readout period is below that charge it may be discarded so that it is not used in the proximity determination and may not, therefore, cause any phase wrapping problems.

Whilst some specific delays between adjacent columns are given above, any suitable delays may be applied. For example the incremental delay applied so that two columns have a different column delay may be different across the imaging sensor 120. In more detail, an incremental delay of 10 ps may be applied between column 1 and column 2 so that column 2 has a column delay 10 ps greater than column 2. An incremental delay of 5 ps may be applied between column 2 and column 3 so that column 3 has a column delay 5 ps greater than column 2. Therefore, the incremental delay is not necessarily a fixed value that applies across the whole imaging sensor.

Furthermore, whilst in the above typically the charge sample readout from the imaging sensor 120 and used for determining proximity includes accumulation values of adjacent columns, in an alternative accumulation values may be used from non-adjacent columns, such as columns 3, 7, 23, 30, 35, wherein at least some of the columns have different column delays.

The image sensor 120 may comprise only ToF imaging pixels that can be used to perform both full resolution ToF imagining and the proximity mode operation described above. However, the inventors have recognised that in an alternative, the image sensor 120 may be implemented to have RGB pixels as well as ToF imaging pixels, for example in groups of four pixels comprising an R pixel, a G pixel, a B pixel and a ToF imaging pixel. In this way, more imaging functionality may be achieved from the same device.

Further optionally, the inventors have recognised that for the imaging sensor 120 possibilities above, ambient light measurements from an ambient light sensor may also be useful. For example, the output of an ambient light sensor may be used for a number of different purposes, for example setting the brightness of a display screen of a device in which the camera system 300 has been included, and/or changing the brightness of the emitted laser light during the proximity mode of operation so as to reduce power consumption where possible (for example, by decreasing the magnitude of laser drive currents when ambient brightness is relatively low) and/or using the ambient brightness to assist in determining a confidence metric for any proximity determinations/depth frames. The ambient light pixels may be tuned to different wavelengths such that they may report on more than one wavelength. Furthermore, ambient light pixels may also be integrated within the image sensor 120 such that a single image sensor may include ambient light pixels, as well as ToF imaging pixels (and optionally also RGB imaging pixels). The ambient light pixels may be distributed throughout the image sensor 120 such that in proximity mode only some of the ambient light pixels may be activated and/or readout during proximity mode operation, to minimise power consumption.

The image sensor 120 described above may be a single ended pixel or differential pixel define (for example, a CMOS single ended or differential sensor design). Therefore, it will be appreciated that each pixel readout may either be single ended or differential.

SELECT EXAMPLES

Example 1 provides a time of flight, ToF, camera system configured to operate in a proximity mode to determine a proximity of an object, the ToF camera system comprising: a laser configured to output laser light; an imaging sensor comprising a plurality of pixels configured to accumulate charge based on incident light that comprises laser light reflected by the object; and an image acquisition system configured, when operating in the proximity mode, to: control a timing of charge accumulation in the imaging sensor using a demodulation signal; and read out a charge sample from the imaging sensor that is indicative of charge accumulated by one or more pixels in each of a plurality of pixel columns of the imaging sensor; and a delay block arranged to apply a column delay to the demodulation signal used by pixel columns of the imaging sensor, such that the timing of application of the demodulation signal to at least some of the plurality of pixel columns of the imaging sensor is different, wherein the amount of charge accumulated in each of the plurality of pixel columns is dependent on: the distance to the object; and the column delay applied by the delay block to the demodulation signal for the pixel column, and wherein the image acquisition system is configured to determine the proximity of the object based on: the read out charge sample; and the column delay of each of the plurality of pixel columns.

Example 2 provides a system according to one or more of the preceding and/or following examples, wherein the image acquisition system is configured to determine the proximity of the object by determining a delay time corresponding to an extremum in a measurement function that describes a relationship between: the read out charge sample; and the column delay applied to the demodulation signal for each of the plurality of pixel columns; and determining the proximity of the object using the delay time corresponding to the extremum in the measurement function.

Example 3 provides a system according to one or more of the preceding and/or following examples the image acquisition system is further configured to determine the proximity of the object by: a) determining a time delay difference by comparing: the delay time corresponding to the extremum in the measurement function; and a predetermined delay time corresponding to an extremum in a function that describes the charge accumulated by the one or more pixels in each of the plurality of pixel columns when an object is at a known distance; and b) determining the proximity of the object using the time delay difference.

Example 4 provides a system according to one or more of the preceding and/or following examples wherein the extremum in the measurement function is a highest or lowest charge value in the read out charge sample, and wherein the delay time corresponding to the extremum in the measurement function is the column delay applied to the pixel column having the highest or lowest charge value in the read out charge sample.

Example 5 provides a system according to one or more of the preceding and/or following examples, wherein determining the delay time corresponding to the extremum in the measurement function comprises: performing interpolation on at least part of the readout charge data; and identifying the extremum and corresponding delay time using the interpolation.

Example 6 provides a system according to one or more of the preceding and/or following examples, wherein determining the proximity of the object comprises: performing an autocorrelation on at least part of the readout charge sample; and comparing the autocorrelation on the readout charge sample against an autocorrelation of the charge accumulated by one or more pixels in each of the plurality of pixel columns when an object is at a known distance.

Example 7 provides a system according to one or more of the preceding and/or following examples, wherein determining the proximity of the object comprises: performing a cross correlation between at least part of the readout charge sample and the charge accumulated by one or more pixels in each of the plurality of pixel columns when an object is at a known distance Example 8 provides a system according to one or more of the preceding and/or following examples, wherein determining the proximity of the object comprises applying a Discrete Fourier Transform, DFT, to at least part of the charge sample readout from the imaging sensor.

Example 9 provides a system according to one or more of the preceding and/or following examples, wherein the ToF camera system is further configured to be operable in a depth sensing mode for the determination of a depth image, wherein the ToF camera system is configured to switchably operate in the proximity mode or the depth mode.

Example 10 provides a system according to one or more of the preceding and/or following examples, wherein the ToF camera system is configured to drive the laser at a lower power when operating in the proximity mode compared with when operating in the depth mode Example 11 provides a system according to one or more of the preceding and/or following examples, wherein the ToF camera system is configured to utilise data from fewer pixels of the imaging sensor when operating in the proximity mode compared with when operating in the depth mode.

Example 12 provides a method of determining a proximity of an object using a ToF camera system, the method comprising: controlling a timing of charge accumulation in the imaging sensor using a demodulation signal, wherein for each pixel column of the imaging sensor a column delay is applied to the demodulation signal such that the start and end timing of charge accumulation varies for different pixel columns across the imaging sensor; reading out a charge sample from an imaging sensor of the ToF camera system, wherein the charge sample is indicative of charge accumulated by one or more pixels in each of a plurality of pixel columns of the imaging sensor; and determining the proximity of the object using the readout charge sample and the column delay applied to each of the plurality of pixel columns.

Example 13 provides a time-of-flight (ToF) camera comprising: a light source configured to output light; an imaging sensor comprising a plurality of pixels configured to accumulate charge based on incident light that comprises light output by the light source and reflected by the object; and an image acquisition system configured to switchably operate in a depth sensing mode or a proximity mode; wherein in the depth sensing mode the image acquisition system is configured to generate a depth frame representing the distance of objects within a field of view of the ToF camera, and wherein in the proximity mode the image acquisition system is configured to determine a proximity of an object to the ToF camera, and wherein the proximity mode of operation has a relatively lower power of operation than the depth sensing mode of operation.

Example 14 provides a ToF camera according to one or more of the preceding and/or following examples, wherein in the proximity mode of operation the image acquisition system is configured to control a timing of charge accumulation in the imaging sensor using a demodulation signal, wherein for each pixel column of the imaging sensor a column delay is applied to the demodulation signal such that the start and end timing of charge accumulation varies for different pixel columns across the imaging sensor; read out a charge sample from an imaging sensor of the ToF camera system, wherein the charge sample is indicative of charge accumulated by one or more pixels in each of a plurality of pixel columns of the imaging sensor; and determining the proximity of the object using the readout charge sample and the column delay applied to each of the plurality of pixel columns.

Example 15 provides a ToF camera according to one or more of the preceding and/or following examples, wherein determining the proximity of the object comprises: determining a first distance to the object using a first set of values in the readout charge sample; determining a second distance to the object using a second set of values in the readout charge sample; and determining the proximity of the object using the first determined distance and the second determined distance.

Example 16 provides a ToF camera according to one or more of the preceding and/or following examples, wherein the image acquisition system is configured to receive a control signal that controls the mode of operation of the image acquisition system.

Example 17 provides a ToF camera according to one or more of the preceding and/or following examples, wherein the image acquisition system is configured to switch from operating in the proximity mode to operate in the depth sensing mode when a determined proximity of the object is within a predetermined proximity.

Example 18 provides a ToF camera according to one or more of the preceding and/or following examples, wherein the image acquisition system is configured to alternative between the proximity mode of operation and a sleep mode of operation according to a predetermined cycle.

Example 19 provides a ToF camera according to one or more of the preceding and/or following examples, wherein the image acquisition system comprises readout circuitry and the image acquisition system is configured to operate the readout circuitry in a lower power mode during the proximity mode compared with during the depth sensing mode.

Example 20 provides a ToF camera according to one or more of the preceding and/or following examples, wherein in the depth sensing mode the image acquisition system is configured to generate the depth frame using a first number of pixel charges readout from the imaging sensor, and wherein in the proximity mode the image acquisition system is configured to determine the proximity of the object using a second number of pixel charges readout from the imaging sensor, and wherein the second number of pixel charges is larger than the first number of pixel charges.

VARIATIONS AND IMPLEMENTATIONS

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:
1. A time of flight, ToF, camera system, comprising:
a laser configured to output laser light;
an imaging sensor comprising a plurality of pixel devices configured to accumulate charge based on incident light that comprises laser light reflected by an object; and
an image acquisition system configured, when operating in a proximity mode, to:

control, using a demodulation signal, a timing of charge accumulation in the imaging sensor; and read out a charge sample from the imaging sensor, wherein the charge sample is indicative of charge accumulated by one or more pixel devices in each of a plurality of pixel columns of the imaging sensor; and a delay block arranged to apply a respective column delay to the demodulation signal used by the plurality of pixel columns, such that a timing of application of the demodulation signal to a column of the plurality of pixel columns of the imaging sensor is different from another timing of application of the demodulation signal to another column of the plurality of pixel columns, wherein an amount of charge accumulated in each pixel column of the plurality of pixel columns is dependent on a distance to the object and the respective column delay applied to the demodulation signal for the pixel column, and wherein the image acquisition system is further configured to determine a proximity of the object based on the readout charge sample and the respective column delay of each pixel column of the plurality of pixel columns.

2. The ToF camera system of claim 1, the image acquisition system is further configured to determine the proximity of the object by determining a delay time corresponding to an extremum in a measurement function that describes a relationship between the readout charge sample and the respective column delay applied to the demodulation signal for each pixel column of the plurality of pixel columns; and determining the proximity of the object using the delay time corresponding to the extremum in the measurement function.

3. The ToF camera system of claim 2, the image acquisition system is further configured to determine the proximity of the object by:

determining a time delay difference by comparing:
the delay time corresponding to the extremum in the measurement function; and
a predetermined delay time corresponding to an extremum in a function that describes the charge accumulated by the one or more pixel devices in each pixel column of the plurality of pixel columns when a particular object is at a defined distance; and determining the proximity of the object using the time delay difference.

4. The ToF camera system of claim 2, wherein the extremum in the measurement function is a highest charge value or lowest charge value in the readout charge sample, and wherein the delay time corresponding to the extremum in the measurement function is the column delay applied to the pixel column having the highest charge value or the lowest charge value in the readout charge sample.

5. The ToF camera system of claim 2, wherein determining the delay time corresponding to the extremum in the measurement function comprises:

performing interpolation on at least part of readout charge data; and identifying the extremum and corresponding delay time using the interpolation.

6. The ToF camera system of claim 1, wherein determining the proximity of the object comprises:

performing an autocorrelation on at least part of the readout charge sample; and comparing the autocorrelation on at least the part of the readout charge sample against an autocorrelation of the charge accumulated by one or more pixel devices in each of the plurality of pixel columns when a particular object is at a defined distance.

7. The ToF camera system of claim 1, wherein determining the proximity of the object comprises:

performing a cross correlation between at least part of the readout charge sample and the charge accumulated by one or more pixels in each of the plurality of pixel columns when an object is at a defined distance.

8. The ToF camera system of claim 1, wherein determining the proximity of the object comprises applying a Discrete Fourier Transform, DFT, to at least part of the readout charge sample.

9. The ToF camera system of claim 1, wherein the ToF camera system is further configured to be operable in a depth sensing mode for a determination of a depth image, wherein the ToF camera system is configured to switchably operate in the proximity mode or the depth sensing mode.

10. The ToF camera system of claim 9, wherein the ToF camera system is configured to drive the laser at a lower power when operating in the proximity mode compared with when operating in the depth sensing mode.

11. The ToF camera system of claim 9, wherein the ToF camera system is configured to utilise data from fewer pixel devices of the imaging sensor when operating in the proximity mode compared with when operating in the depth sensing mode.

12. A method of determining a proximity of an object using a ToF camera system, the method comprising:

controlling, using a demodulation signal, a timing of charge accumulation in an imaging sensor of the ToF camera system, wherein for each pixel column of the imaging sensor a respective column delay is applied to the demodulation signal such that the start and end timing of charge accumulation varies for different pixel columns across the imaging sensor;

reading out a charge sample from the imaging sensor, wherein the charge sample is indicative of charge accumulated by one or more pixel devices in each pixel column of a plurality of pixel columns of the imaging sensor; and determining the proximity of the object using the readout charge sample and the respective column delay applied to each pixel column of the plurality of pixel columns.

13. A ToF camera comprising:

a light source configured to output light;

an imaging sensor comprising a plurality of pixel devices configured to accumulate charge based on incident light that comprises light output by the light source and light reflected by an object; and an image acquisition system configured to transition, controllably, between a depth sensing mode of operation and a proximity mode of operation;

wherein in the depth sensing mode, the image acquisition system is configured to generate a depth frame representing the distance of objects within a field of view of the ToF camera, and wherein in the proximity mode, the image acquisition system is configured to determine, using readout charge data from the imaging sensor and respective column delays applied to pixel columns across the imaging sensor, a proximity of the object to the ToF camera, and wherein the proximity mode has a relatively lower power of operation than the depth sensing mode.

14. The ToF camera of claim 13, wherein to determine, using the readout charge data and the respective column delays, the proximity of the object to the ToF camera, the image acquisition system is further configured to,
control, using a demodulation signal, a timing of charge accumulation in the imaging sensor, wherein for each pixel column of the imaging sensor a column delay is applied to the demodulation signal such that the start and end timing of charge accumulation varies for different pixel columns across the imaging sensor;
read out a charge sample from the imaging sensor, wherein the charge sample is indicative of charge accumulated by one or more pixels in each pixel column of a plurality of pixel columns of the imaging sensor; and
determine proximity of the object using the readout charge sample and the column delay applied to each of the plurality of pixel columns.

15. The ToF camera of claim 14, wherein determining the proximity of the object comprises:
determining a first distance to the object using a first set of values in the readout charge sample;
determining a second distance to the object using a second set of values in the readout charge sample; and
determining the proximity of the object using the determined first distance and the determined second distance.

16. The ToF camera of claim 13, wherein the image acquisition system is further configured to receive a control signal that controls a mode of operation of the image acquisition system.

17. The ToF camera of claim 13, wherein the image acquisition system is further configured to switch from operating in the proximity mode to operating in the depth sensing mode when a determined proximity of the object is within a defined proximity.

18. The ToF camera of claim 13, wherein the image acquisition system is further configured to alternate between the proximity mode of operation and a sleep mode of operation according to a defined cycle.

19. The ToF camera of claim 13, wherein the image acquisition system comprises readout circuitry and is further configured to operate the readout circuitry in a lower power mode during the proximity mode compared with during the depth sensing mode.

20. The ToF camera of claim 13, wherein in the depth sensing mode the image acquisition system is configured to generate the depth frame using a first number of pixel charges readout from the imaging sensor, and
wherein in the proximity mode the image acquisition system is configured to determine the proximity of the object using a second number of pixel charges readout from the imaging sensor, and
wherein the second number of pixel charges is greater than the first number of pixel charges.

* * * * *